US009305009B1

(12) United States Patent
Bono et al.

(10) Patent No.: US 9,305,009 B1
(45) Date of Patent: Apr. 5, 2016

(54) SYNCHRONOUS REPLICATION OF VIRTUALIZED STORAGE PROCESSORS

(71) Applicant: EMC Corporation, Hopkinton, MA (US)

(72) Inventors: Jean-Pierre Bono, Westborough, MA (US); Himabindu Tummala, South Grafton, MA (US); Assaf Natanzon, Tel Aviv (IL)

(73) Assignee: EMC Corporation, Hopkinton, MA (US)

( * ) Notice: Subject to any disclaimer, the term of this patent is extended or adjusted under 35 U.S.C. 154(b) by 214 days.

(21) Appl. No.: 14/041,191

(22) Filed: Sep. 30, 2013

(51) Int. Cl.
*G06F 17/00* (2006.01)
*G06F 7/00* (2006.01)
*G06F 17/30* (2006.01)

(52) U.S. Cl.
CPC .............................. *G06F 17/30174* (2013.01)

(58) Field of Classification Search
CPC ................................................ G06F 17/30174
USPC .......................................................... 707/634
See application file for complete search history.

(56) References Cited

U.S. PATENT DOCUMENTS

| | | | |
|---|---|---|---|
| 7,194,595 B1 * | 3/2007 | Fair et al. ....................... | 711/202 |
| 7,254,685 B1 | 8/2007 | Cardente | |
| 7,631,155 B1 | 12/2009 | Bono et al. | |
| 8,433,869 B1 | 4/2013 | Natanzon et al. | |
| 2004/0030668 A1 | 2/2004 | Pawlowski et al. | |
| 2005/0246397 A1 * | 11/2005 | Edwards et al. ............... | 707/204 |
| 2006/0069862 A1 * | 3/2006 | Kano .................... | G06F 3/0605 711/114 |
| 2007/0174526 A1 * | 7/2007 | Blackwell ............... | G06F 13/12 710/73 |
| 2009/0313503 A1 | 12/2009 | Atluri et al. | |
| 2011/0154318 A1 * | 6/2011 | Oshins ................ | G06F 9/45537 718/1 |
| 2011/0246171 A1 * | 10/2011 | Cleeton ............... | G06F 9/45558 703/25 |
| 2011/0320556 A1 * | 12/2011 | Reuther ................ | G06F 9/4856 709/213 |
| 2012/0059976 A1 * | 3/2012 | Rosenband ............. | G06F 3/061 711/103 |
| 2012/0084775 A1 * | 4/2012 | Lotlikar .............. | G06F 9/45558 718/1 |
| 2012/0317084 A1 * | 12/2012 | Liu ....................... | G06F 3/0641 707/692 |

OTHER PUBLICATIONS

Bono, "Unified Datapath Architecture," U.S. Appl. No. 13/828,322, filed Mar. 14, 2013.
Bono, et al., "Unified Datapath Processing With Virtualized Storage Processors," U.S. Appl. No. 13/828,294, filed Mar. 14, 2013.
Bono, et al., et al., "Automatically Creating Multiple Replication Sessions in Response to a Single Replication Command Entered by a User," U.S. Appl. No. 13/837,825, filed Mar. 15, 2013.
Bono, et al., "Virtual Storage Processor Failover," U.S. Appl. No. 13/838,540, filed Mar. 15, 2013.

(Continued)

*Primary Examiner* — Pavan Mamillapalli
(74) *Attorney, Agent, or Firm* — BainwoodHuang

(57) ABSTRACT

A technique for managing replication of VSPs (Virtualized Storage Processors) proceeds on a per-VSP basis by (i) identifying the data objects associated with a VSP, (ii) establishing a common set of replication settings across all of the data objects associated with the VSP, and (iii) replicating the VSP by replicating each of the identified data objects associated with the VSP in accordance with the common set of replication settings established across all of the data objects associated with the VSP. The technique avoids the need for administrators to separately configure and manage replication on large numbers of individual data objects and thus reduces administrative burdens.

23 Claims, 12 Drawing Sheets

(56) References Cited

OTHER PUBLICATIONS

Bono, et al., "Unified Data Protection for Block and File Objects," U.S. Appl. No. 13/853,508, filed Mar. 29, 2013.

Bono, et al., "Preserving Quality of Service When Replicating Data Objects," U.S. Appl. No. 14/576,939, filed Dec. 19, 2014.

EMC Corporation, "Configuring Virtual Data Movers on VNX," (http://corpusweb130.emc.com/upd_prod_VNX/UPDFinalPDF/jp/VDMs.pdf) Feb. 2011.

EMC Corporation, "Using EMC Celerra Replicator," Feb. 2009.

EMC Corporation, "EMC Celerra Replicator," (http://chucksblog.emc.com/content/CelerraReplicator.pdf) 2008.

EMC Corporation, "EMC RecoverPoint Family," (http://www.emc.com/collateral/software/data-sheet/h2769-recoverpoint-ds.pdf) Aug. 2013.

EMC Corporation, "EMC Business Continuity and Disaster Recovery Solutions," (https://enterpriseportalcontent.mci.com/NR/rdonlyres/7A037904-A72F-4C79-BC21-4731442BFD9A/0/SoCDREventEMCReplicationRW.pdf) 2008.

EMC Corporation, "Array-Based Replication with EMC VPLEX," (http://www.emc.com/collateral/hardware/white-papers/h8005-array-based-replication-vplex-wp.pdf) Aug. 2010.

\* cited by examiner

SYNCHRONOUS REPLICATION OF VIRTUALIZED STORAGE PROCESSORS

BACKGROUND

Data storage systems commonly employ replication solutions for protecting the data they store. Conventional replication solutions furnish either block-based solutions, e.g., for replicating LUNs (Logical Unit Numbers—although the term generally refers to the units themselves) or file-based solutions, e.g., for replicating file systems or individual files. Block-based solutions operate on storage volumes, e.g., using Fibre Channel or iSCSI (Internet Small Computer System Interface) protocols, whereas file-based solutions operate on files and file systems, e.g., using NFS (Network File System), CIFS (Common Internet File System), or SMB 3.0 (Server Message Block) protocols.

A well-known example of a block-based replication solution is the RecoverPoint system available from EMC Corporation of Hopkinton, Mass. RecoverPoint systems include a replication splitter realized in software, e.g., on a storage processor (SP) that accesses a local block-based array, one or more local replication appliances, and one or more remote replication appliances connected to a remote array configured as a replica site. As a data storage system receives IO requests specifying data to be written to a particular LUN on the local block-based array, the replication splitter intercepts the IO request and sends it to the local replication appliance (or appliances), e.g., over a Fibre Channel or iSCSI connection. The local appliance communicates with the remote appliance, e.g., over a WAN (Wide Area Network), and manages the storage of the data specified in the IO request at the replica site. In this manner, the replica site is made to store data that provide a redundant copy of data on the LUN, which may be used to recover the contents of the LUN in the event of a failure on the local array.

A well-known example of a file-based replication solution is the Celerra Replicator™ V2, also available from EMC Corporation of Hopkinton, Mass. Replicator V2 includes software for performing replication on files and file systems. Replicator V2 operates by taking snaps (e.g., point in time copies, also known as "snapshots" or "checkpoints") of files and file systems at a local site, comparing current snaps with previous snaps, identifying differences, and sending the differences to a destination site. The destination site accumulates and stores the differences, which can be reconstituted to recover the file or file system being replicated in the event of a failure at the local site. File-based replication solutions often provide advanced features for establishing and maintaining replication sessions, managing recovery and failover, and ensuring that particular settings and restrictions applied to file systems being replicated carry over to replicas at the destination site.

Conventional replication solutions may perform synchronous replication or asynchronous replication. "Synchronous" replication refers to replication that takes place in band with IO requests as the IO requests arrive. With synchronous replication, data conveyed in individual IO requests are generally persisted to a replica site on an individual basis, e.g., one-by-one, as the IO requests are processed. In contrast, "asynchronous" replication is performed out of band with individual IO requests, with replicas generated, for example, on demand, at regular intervals, and/or in response to particular events. Bearing this distinction in mind, RecoverPoint may be regarded as a synchronous replication solution, although it may also provide asynchronous capabilities. Replicator V2 may be regarded as an asynchronous solution, as acquiring snaps and computing differences between them are performed out of band with IO processing.

SUMMARY

Users of data storage systems often store multiple file systems on a data storage system and may employ Virtual Data Movers (VDMs) for organizing file systems into groups. For example, each VDM may be associated with multiple file systems belonging to a particular user or user group. However, users continue to face challenges when managing their file systems, particularly where replication is concerned. For example, conventional replication solutions require administrators or other users to configure replication settings and to establish individual replication sessions on each file system of a VDM, i.e., one at a time. As each user may operate tens or even hundreds of file systems on a data storage system, configuring and establishing replication sessions on such large numbers of file systems can present a significant administrative burden.

In contrast with conventional replication solutions, an improved technique for managing replication of VSP (Virtualized Storage Processor) in a data storage system proceeds on a per-VSP basis by (i) identifying the data objects (e.g., file systems, LUNs, block-based vVOLs, file-based vVOLs, etc.) associated with a particular VSP, (ii) establishing a common set of replication settings across all of the data objects associated with that VSP, and (iii) replicating the VSP by replicating each of the identified data objects associated with the VSP in accordance with the common set of replication settings established across all of the data objects associated with the VSP.

In accordance with improvements hereof, certain embodiments are directed to a method of managing synchronous replication of VSPs (Virtualized Storage Processors) in a data storage system. The method includes establishing a first set of synchronous replication settings specific to a first VSP and a second set of synchronous replication settings specific to a second VSP. The first VSP includes a first set of multiple data objects, and the second VSP includes a second set of multiple data objects distinct from the first set of multiple data objects. Each data object of the first set of multiple data objects and the second set of multiple data objects is any of a file system, a LUN (logical storage unit), and a vVOL (virtual volume). The method further includes, in response to the data storage system receiving first IO requests specifying data to be written to any of the first set of multiple data objects, synchronously replicating the first IO requests in accordance with the first set of synchronous replication settings specific to the first VSP. The method still further includes, in response to the data storage system receiving second TO requests specifying data to be written to any of the second set of multiple data objects, synchronously replicating the second TO requests in accordance with the second set of synchronous replication settings specific to the second VSP.

Other embodiments are directed to a data storage apparatus constructed and arranged to perform the method described above. Still other embodiments are directed to a computer program product. The computer program product stores instructions, which when executed on one or more processing units of a data storage apparatus, cause the data storage apparatus to perform the method described above. Some embodiments involve activity that is performed at a single location, while other embodiments involve activity that is distributed over a computerized environment (e.g., over a network).

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same parts throughout the different views. In the accompanying drawings.

DETAILED DESCRIPTION OF THE INVENTION

Embodiments of the invention will now be described. It is understood that such embodiments are provided by way of example to illustrate various features and principles of the invention, and that the invention hereof is broader than the specific example embodiments disclosed.

An improved technique for managing replication of VSPs (Virtualized Storage Processors) proceeds on a per-VSP basis by (i) identifying the data objects associated with a VSP, (ii) establishing a common set of replication settings across all of the data objects associated with the VSP, and (iii) replicating the VSP by replicating each of the identified data objects associated with the VSP in accordance with the common set of replication settings established across all of the data objects associated with the VSP.

This document is presented in sections to assist the reader in identifying desired information. In the material that follows:

Section I presents an example environment in which improved techniques hereof may be practiced and describes, inter alia, a unified datapath architecture for expressing both block-based objects and file-based objects as respective underlying volumes and underlying files, which enables the use of a common replication approach for both block-based and file-based objects.

Section II presents particular example improvements for effecting synchronous replication of both block-based and file-based objects on a per-user-object basis under the direction of a common replication session manager.

Section III presents particular improvements for unifying both synchronous and asynchronous replication of both block-based and file-based objects.

Section IV presents particular improvements for extending synchronous replication on a per-user-object basis to VSPs (Virtualized Storage Processors), where each VSP is treated as a data object and replication on VSPs is conducted on a per-VSP basis.

Figure 1:
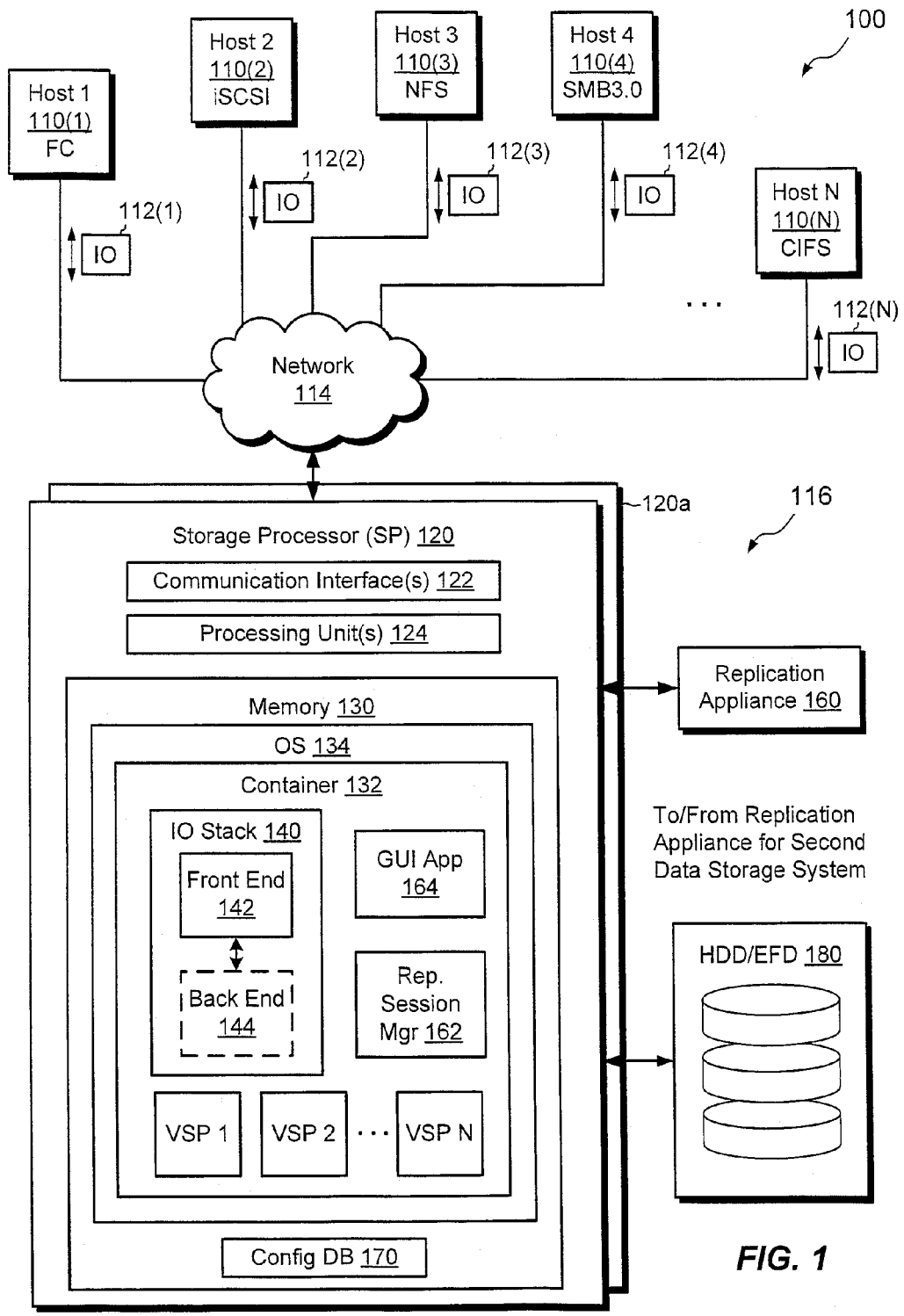
FIG. 1 is a block diagram showing an example environment in which improved techniques hereof may be practiced, wherein the example environment includes a data storage system having a storage processor.

I) Example Environment Including Unified Datapath Architecture:

FIG. 1 shows an example environment 100 in which embodiments of the improved technique hereof can be practiced. Here, multiple host computing devices ("hosts"), shown as devices 110(1) through 110(N), access a data storage system 116 over a network 114. The data storage system 116 includes a storage processor, or "SP," 120 and storage 180. The storage 180 is provided, for example, in the form of hard disk drives and/or electronic flash drives. The data storage system 116 may include multiple SPs like the SP 120 (see, for example, a second SP 120a). For instance, multiple SPs may be provided as circuit board assemblies, or "blades," which plug into a chassis that encloses and cools the SPs. The chassis has a backplane for interconnecting the SPs, and additional connections may be made among SPs using cables. It is understood, however, that no particular hardware configuration is required, as any number of SPs (including a single one) can be provided and the SP 120 can be any type of computing device capable of processing host IOs.

The network 114 can be any type of network or combination of networks, such as a storage area network (SAN), local area network (LAN), wide area network (WAN), the Internet, and/or some other type of network, for example. In an example, the hosts 110(1-N) connect to the SP 120 using various technologies. For example, the host 110(1) can connect to the SP 120 using Fibre Channel (e.g., through a SAN). The hosts 110(2-N) can connect to the SP 120 using TCP/IP, to support, for example, iSCSI, NFS, SMB 3.0, and CIFS. Any number of hosts 110(1-N) may be provided, using any of the above protocols, some subset thereof, or other protocols besides those shown. As is known, Fibre Channel and iSCSI are block-based protocols, whereas NFS, SMB 3.0, and CIFS are file-based protocols. The SP 120 is configured to receive IO requests 112(1-N) according to both block-based and file-based protocols and to respond to such IO requests 112(1-N) by reading or writing the storage 180.

The SP 120 is seen to include one or more communication interfaces 122, a set of processing units 124, and memory 130. The communication interfaces 122 include, for example, adapters, such as SCSI target adapters and network interface adapters, for converting electronic and/or optical signals received from the network 114 to electronic form for use by the SP 120. The set of processing units 124 include one or more processing chips and/or assemblies. In a particular example, the set of processing units 124 includes numerous multi-core CPUs. The memory 130 includes both volatile memory (e.g., RAM), and non-volatile memory, such as one or more ROMs, disk drives, solid state drives (SSDs), and the like. The set of processing units 124 and the memory 130 together form control circuitry, which is constructed and arranged to carry out various methods and functions as described herein. Also, the memory 130 includes a variety of software constructs realized in the form of executable instructions. When the executable instructions are run by the set of processing units 124, the set of processing units 124 are caused to carry out the operations of the software constructs. Although certain software constructs are specifically shown and described, it is understood that the memory 130 typically includes many other software constructs, which are not shown, such as various applications, processes, and daemons.

As shown, the memory 130 includes an operating system 134, such as Unix, Linux, or Windows™, for example. The memory 130 further includes a container 132. In an example, the container 132 is a software process that provides an isolated userspace execution context within the operating system 134. In various examples, the memory 130 may include multiple containers like the container 132, with each container providing its own isolated userspace instance. Although containers provide isolated environments that do not directly interact (and thus promote fault containment), different containers can run on the same kernel (not shown) and can communicate with one another using inter-process communication (IPC) mediated by the kernel. Containers are well-known features of Unix, Linux, and other operating systems.

In the example of FIG. 1, only a single container 132 is shown. Running within the container 132 is an IO stack 140, a replication session manager 162, a Graphical User Interface (GUI)-based application 164, and multiple VSPs (Virtualized Storage Processors) VSP 1 to VSP N. A VSP is a collection of data objects, internal file systems, and servers (e.g., NFS and/or CIFS servers), which together provide a mechanism for grouping objects and providing a common set of network interfaces such that the VSP appears from outside the SP 120 as similar to a physical SP. More information about VSPs may be found in copending U.S. patent application Ser. No. 13/828,294, filed Mar. 14, 2013, the contents and teachings of which are hereby incorporated by reference in their entirety. Although certain components are shown residing within the container 132, alternatively different components reside in different containers. For example, the GUI-application 164 may run within a dedicated container and communicate with the replication session manager 162 using IPC.

The IO stack 140 provides an execution path for host IOs (e.g., IO requests 112(1-N)) and includes a front end 142 and a back end 144. In alternative arrangements, the back end 144 is located on another SP (e.g., SP 120a) or is provided in a block-based array connected to the SP 120 (e.g., in a gateway configuration).

The replication appliance 160 assists in performing block-based replication of both block-based objects and file-based objects to a second data storage system, which may be located locally to the data storage system 116 or remotely. In an example, the replication appliance 160 takes the form of a hardware unit, and multiple such units may be provided, e.g., for supporting strong data compression and other advanced features. For purposes of this document, it is understood that this document refers to the replication appliance 160 as a single component, although that component include any number of units, which operate in coordination with one another, e.g., in a cluster.

The replication session manager 162 controls the establishment of replication settings on particular data objects, including VSPs. The replication session manager 162 establishes replication settings on a per-data-object basis, conducts replication sessions with replica sites, and orchestrates replication activities, including recovery and failover activities.

The GUI application 164 provides a user interface for configuring the replication session manager 162, e.g., for establishing replication settings on particular data objects. As the IO stack 140, replication appliance 160 (optionally), replication session manager 162, and GUI application 164 all run within the same container 132, the IO stack 140, replication appliance 160 (optionally), and replication session manager 162 can communicate with one another using APIs (application program interfaces) and pointer passing and without the need to use IPC.

The memory 130 is further seen to include a configuration database 170. The configuration database 170 stores configuration information pertaining to the data storage system 116, including information about the VSPs 1-N and the data objects with which they are associated. In other implementations, the data storage system 116 stores the configuration database 170 elsewhere, such as or in the storage 180, on a disk drive of flash drive separate from the SP 120 but accessible to the SP 120, e.g., over a backplane or network, or in some other location.

In operation, the hosts 110(1-N) issue IO requests 112(1-N) to the data storage apparatus 116. The IO requests 112(1-N) may include both block-based requests and file-based requests. The SP 120 receives the IO requests 112(1-N) at the communication interfaces 122 and passes the IO requests to the IO stack 140 for further processing. At the front end 142, processing may include mapping IO requests directed to LUNs, host file systems, vVOLs (virtual volumes, e.g., as soon available for VMware, Inc. of Palo Alto, Calif.), VMDKs (virtual memory disks), and other data objects to block-based requests presented to internal volumes, as well as mapping the internal volumes to respective files stored in a set of internal file systems of the data storage system 116. Host IO requests received at the SP 120 for reading and writing block-based objects and file-based objects are thus converted to reads and writes of respective volumes, which are then converted to reads and writes of respective files. As will be described further below, the front end 142 may perform block-based synchronous replication at the level of the internal volumes, where the front end 142 presents both block-based objects and file-based objects in block-based form. After processing by the front end 142, the IO requests propagate to the back end 144, where the back end 144 executes commands for reading and/or writing the physical storage 180, agnostically to whether the data read and/or written is directed to a block-based object or a file-based object.

Figure 2:
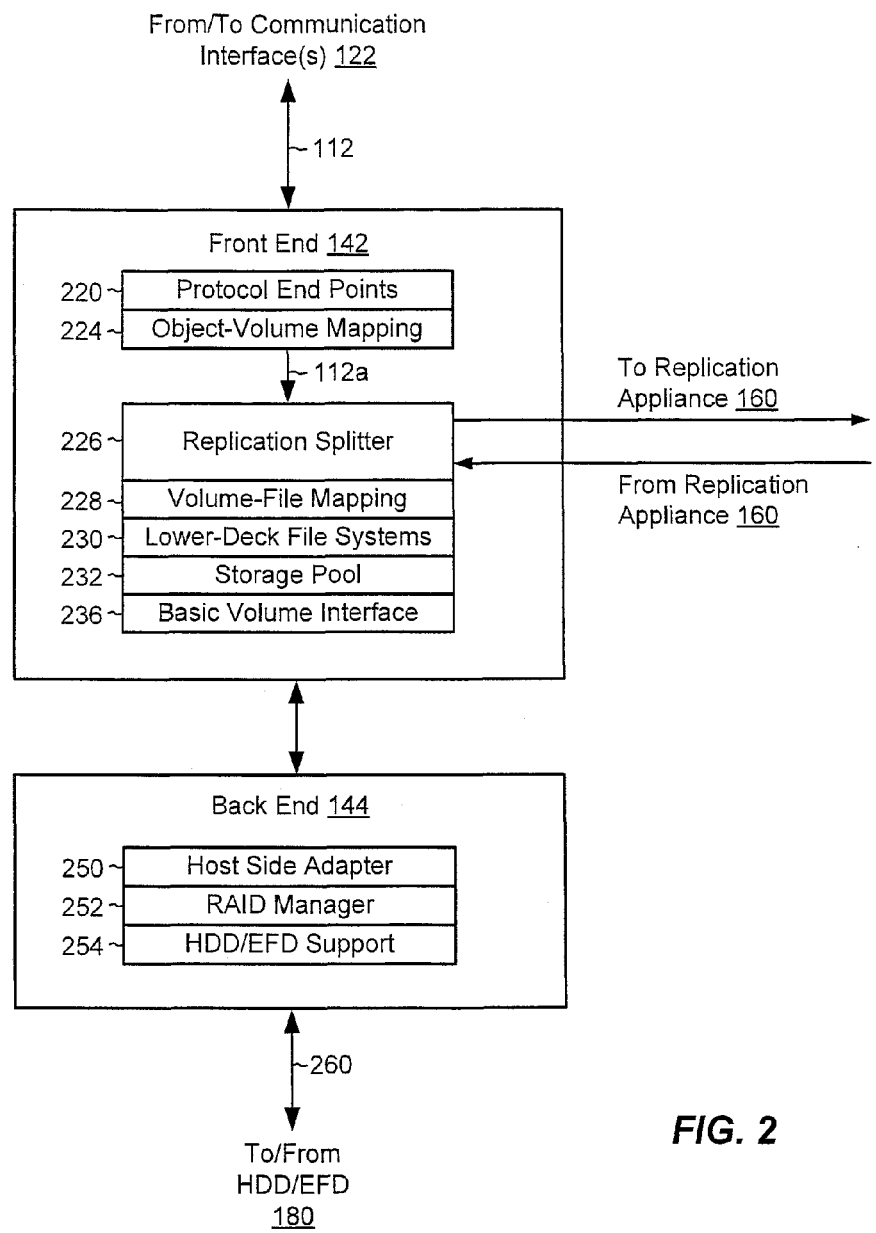
FIG. 2 is a block diagram showing an example IO stack of the storage processor shown in of FIG. 1.

FIG. 2 shows the front end 142 and back end 144 of the IO stack 140 in additional detail. Here, the front end 142 is seen to include protocol end points 220, a data object layer 222, an object-volume mapping layer 224, a replication splitter 226, a volume-file mapping 228, lower-deck (internal) file systems 230, a storage pool 232, and a basic volume interface 236. The back end 144 is seen to include a host side adapter 250, a RAID (Redundant Array of Independent Disks) manager 252, and hard disk drive/electronic flash drive support 254. Although IO requests 112 enter the IO stack 140 from the top and propagate down (from the perspective of FIG. 2), for ease of understanding, the different components of the IO stack 140 are described herein from the bottom up.

At the back end 144, the hard disk drive/electronic flash drive support 254 includes drivers that perform the actual reading from and writing to the storage 180. The RAID manager 252 accesses particular storage units (slices) written or read using RAID protocols. The host side adapter 250 provides an interface to the front end 142, for instances in which the front end 142 and back end 144 are run on different machines. When the front end 142 and back end 144 are co-located on the same SP, as they are in FIG. 1, the host side adapter 250 may be omitted or made to perform no operation.

Continuing to the front end 142, the basic volume interface 236 provides an interface to the back end 144 for instances in which the front end 142 and back end 144 are run on different hardware. The basic volume interface 236 may also be inactive in the arrangement shown in FIG. 1.

The storage pool 232 organizes elements of the storage 180 in the form of slices. A "slice" is an increment of storage space, such as 256 MB or 1 GB in size, which is derived from the storage 180. The pool 232 may allocate slices to lower-deck file systems 230 for use in storing their files. The pool 232 may also deallocate slices from lower-deck file systems 230 if the storage provided by the slices is no longer required. In an example, the storage pool 232 creates slices by accessing RAID groups formed by the RAID manager 252, dividing the RAID groups into FLUs (Flare LUNs), and further dividing the FLU's into slices.

The lower-deck file systems 230 are built upon slices managed by a storage pool 232 and represent both block-based objects and file-based objects internally in the form of files. The data storage system 116 may host any number of lower-deck file systems 230, and each lower-deck file system may include any number of files. In a typical arrangement, a different lower-deck file system is provided for each data object to be stored. Each lower-deck file system includes one file that stores the data object itself and, in some instances includes other files that store snaps of the file that stores the data object. Each lower-deck file system 230 has an inode table. The inode table provides a different inode for each file stored in the respective lower-deck file system. The inode table may also store properties of the file(s), such as their ownership and block locations at which the file's/files' data are stored.

The volume-file mapping 228 maps each file representing a data object to a respective volume, which is accessible using block-based semantics. The volume-file mapping can be achieved in a variety of ways. According to one example, a file representing a data object is regarded as a range of blocks (e.g., 8K allocation units), and the range of blocks can be expressed as a corresponding range of offsets into the file. Because volumes are accessed based on starting location (logical unit number) and offsets in the volume, the volume-file mapping 228 can establish a one-to-one correspondence between offsets into the file and offsets into the corresponding internal volume, thereby providing the requisite mapping needed to express the file in the form of a volume.

The replication splitter 226 sits above the volume-file mapping 228. The replication splitter 226 is configurable by the replication session manager 162 on a per-data-object basis to intercept IO requests and to replicate the data specified to be written in such requests according to data-object-specific settings. Depending on the data object to which the IO request is directed and the replication settings defined for that object, the replication splitter 226 may allow IO requests it receives to pass through to the volume-file mapping 228 unimpeded (e.g., if no replication is specified for that data object). Alternatively, the replication splitter 226 may intercept the IO request, forward the request to the replication appliance 160, and hold the request until the replication splitter 226 receives an acknowledgement back from the replication appliance 160. Once the acknowledgement is received, the replication splitter 226 may allow the IO request to continue propagating down the IO stack 140. It should be understood that the replication session manager 162 can configure the replications splitter 226 in a variety of ways for responding to different types of IO requests. For example, replication session manager 162 can configure the replication splitter 226 to operate in a pass-through mode for control IOs and for IO requests specifying data reads. In some situations, the replication session manager 162 can configure the replication splitter 226 to intercept reads as well as writes. In any such situations, the replication session manager 162 can configure the replication splitter 226 on a per-data-object basis.

The object-volume mapping layer 224 maps internal volumes to respective data objects, such as LUNs, host file systems, and vVOLs. Mapping underlying volumes to host-accessible LUNs may simply involve a remapping operation from a format compatible with the internal volume to a format compatible with the LUN. Mapping internal volumes to host file systems, however, may be accomplished in part by leveraging from the fact that file systems are customarily built upon volumes, such that an underlying volume is part of the structure of a host file system. Host file systems, also called "upper-deck file systems," are thus built upon the internal volumes presented by the volume-file mapping 228 to provide hosts with access to files and directories. Mapping of vVOLs can be achieved in similar ways. For block-based vVOLs, the object-volume mapping layer 224 may perform mapping substantially as it does for LUNs. File-based vVOLs may be mapped, for example, by converting host-specified offsets into vVOL files to corresponding offsets into internal volumes.

The protocol end points 220 expose the underlying data objects to hosts in accordance with respective protocols for accessing the data objects. Thus, the protocol end points 220 may expose block-based objects (e.g., LUNs and block-based vVOLs) using Fiber Channel or iSCSI and may expose file-based objects (e.g., host file systems, file-based vVOLs, and VMDKs) using NFS, CIFS, or SMB 3.0, for example.

In operation, the IO stack 140 receives an IO request 112 specifying data to be written to a particular data object. The object-volume mapping 224 maps the IO request 112 to a block-based request 112a directed to an internal volume. The replication splitter 226 may intercept the block-based request 112a and send the block-based request 112a to the replication appliance 160 (or may pass through the IO request, depending on settings established by the replication session manager 162 for the data object). Assuming the replication splitter 226 intercepts the block-based request 112a, the replication appliance 160 coordinates with other components to replicate the data specified in the block-based request 112a at a second site and provides the replication splitter 226 with an acknowledgement. When the replication splitter 226 receives the acknowledgement, the replication splitter 226 allows the block-based request 112a to continue propagating down the IO stack 140. The volume-file mapping 228 maps the block-based request 112a to one that is directed to a particular file of a lower-deck file system, and the back end 144 and storage 180 process the IO request by writing the specified data to actual media. In this manner, the IO stack 140 supports both local storage of the data specified in the IO request 112 and replication at a second site.

Figure 3:
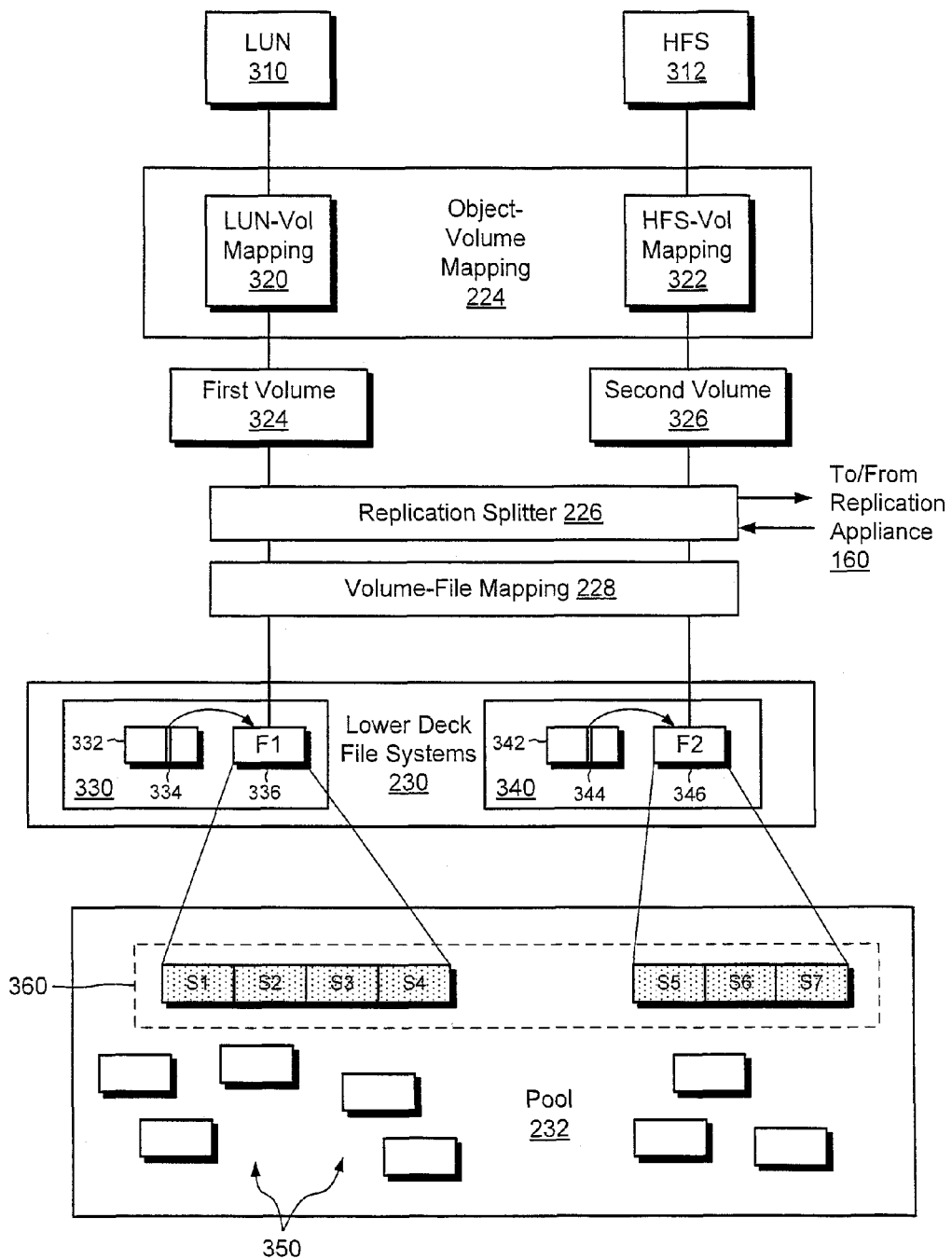
FIG. 3 is a block diagram showing example features of the IO stack of FIG. 2 in additional detail.

FIG. 3 shows portions of the front end 142 in additional detail. Here, data objects include a LUN 310 and an HFS (host file system) 312. The object-volume mapping 224 includes a LUN-to-Volume mapping 320 and an HFS-to-Volume mapping 322. Using the approach described above, the LUN-to-Volume mapping 320 maps the LUN 310 to a first volume 324, and the HFS-to-Volume mapping 322 maps the HFS 312 to a second volume 326. The replication splitter 226 may intercept IOs in accordance with settings established by the replication session manager 262 (as described above). The Volume-to-File mapping 228 maps the first and second internal volumes 324 and 328 to respective files 336 (F1) and 346 (F2) in respective lower-deck files systems 330 and 340. Through the various mappings, any set of blocks of the LUN 310 specified in an IO request 112 is mapped to a corresponding set of blocks within the first file 336. Similarly, any file or directory of the HFS 312 specified in an IO request 112 is mapped to a corresponding set of blocks within the second file 346.

The lower-deck file system 330 includes an inode table 332, and the lower-deck file system 340 includes an inode table 342. An inode 334 provides file-specific information about the first file 336, and an inode 344 provides file-specific information about the second file 346. The information stored in each inode includes location information (e.g., block locations) where data of the respective file are stored.

Although a single file is shown for each of the lower-deck file systems 330 and 340, it is understood that each of the lower-deck file systems 330 and 340 may include any number of files, with each having its own entry in the respective inode table. In one example, each lower-deck file system stores not only the file F1 or F2, but also snaps of those files, and therefore snaps of the data objects the files store. For example, the first lower-deck file system 330 stores the first file 336 representing the LUN 310 along with a different file for each snap of the LUN 310. Similarly, the second lower-deck file system 340 stores the second file 346 representing the HFS 312 along with a different file for every snap of the HFS 312.

As shown, the storage pool 232 allocates slices 360 for providing storage for the first file 336 and the second file 346. In the example show, slices S1 through S4 store the data of the first file 336, and slices S5 through S7 store the data of the second file 346. The data that make up the LUN 310 are thus stored in the slices S1 through S4, whereas the data that make up the HFS 312 are stored in the slices S5 through S7.

II) Synchronous Replication of Block-Based and File-Based Objects:

Example techniques for performing synchronous replication on both block-based objects and file-based objects are now described in connection with FIGS. 4-7. As is known, "synchronous" replication refers to replication performed in band with IO requests 112 as the IO requests arrive. With synchronous replication, individual IO request data are generally persisted to a replica site on an individual basis, e.g., one-by-one, as the IO requests arrive. In contrast, "asynchronous" replication is performed out of band with individual IO requests, with replicas generated, for example, on demand, at regular intervals, and/or in response to particular events.

Figure 4:
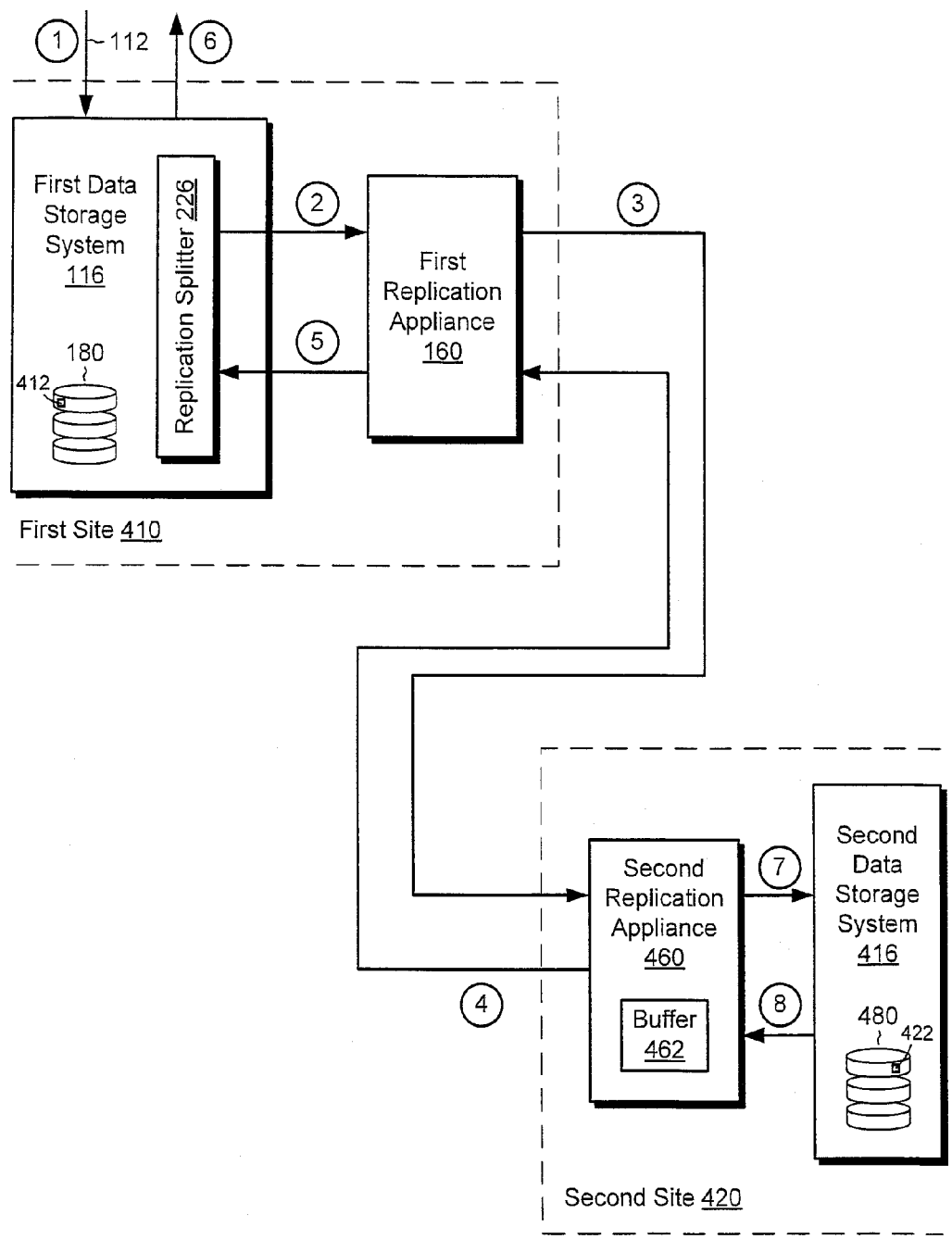
FIG. 4 is a block diagram showing synchronous replication between a first data storage system at a first site and a second data storage system at a second site.

FIG. 4 shows an example arrangement for performing synchronous replication of a data object 412 from a first data storage system 116 (as shown in FIG. 1) to a second data storage system 416. Here, the first data storage system 116 is located at a first site 410 and the second data storage system 416 is located at a second site 420. In an example, the first site 410 and the second site 420 are located at different geographical locations, such as in different buildings of a city or campus. The second data storage system 416 includes persistent storage 480 (e.g., disk drives, flash drives, and the like) and is operatively connected to a second replication appliance 460. The second replication appliance 460 includes a buffer 462, which may be implemented in non-volatile memory (e.g., on disk or flash). In some examples, the buffer 462 is implemented in high-speed non-volatile memory within the storage 480, but separate and apart from any replica storage. Further, the second replication appliance 460 may be included entirely within the second data storage 116, similar to the way in which the first replication appliance 160 is included within the first data storage system 116 (see FIG. 1). Although the components at the first site 410 and the second site 420 are shown to be different, they may alternatively be the same, so as to provide symmetrical behavior, with each site storing a replica of data objects from the other. As shown in this example, however, the first site 410 acts to receive and process IO requests 112 from hosts, whereas the second site 420 acts to provide a replica 422 of the data object 412 on the first site 410.

The encircled numbers in FIG. 4 identify an example sequence of events. At (1), the first data storage system 116 receives an IO request 112 specifying data to be written in the storage 180 for a particular data object 412 (e.g., a LUN, a host file system, a vVOL, etc.). The IO request 112 propagates down the IO stack 140 (FIG. 2) and encounters the replication splitter 226. The replication splitter 226 intercepts the IO request and temporarily prevents the IO request from propagating further down the IO stack 140 (FIG. 2). At (2), the replication splitter 226 sends the IO request (e.g., a version thereof) to the first replication appliance 160. At (3), the first replication appliance 160 forwards the IO request to the second replication appliance 460, which stores the data specified in the IO request in the buffer 462. At (4), the second replication appliance 460 acknowledges safe storage of the IO data to the first replication appliance 160 (e.g., that the IO data are persisted in the buffer 462). At (5), the first replication appliance 160 in turn acknowledges receipt to the replication splitter 226. Only when the replication splitter 226 receives the acknowledgement does the replication splitter 226 allow the IO request to continue propagating down the IO stack 140 (FIG. 2) to complete the write operation to the storage 180. At (6), the first data storage system 116 acknowledges completion of the IO request 112 back to the originating host. Asynchronously with the IO request, the second replication appliance 460 may de-stage the buffer 462 to the replica 422 of the data object maintained in the storage 480. For example, at (7), the data specified in the IO request are transferred from the buffer 462 to the storage 480, and at (8), the second data storage system acknowledges completion.

Many variants are contemplated. For example, the buffer 462 may be realized using volatile memory (e.g., RAM). In such cases, the second replication appliance 460 may wait to acknowledge a write to the first replication appliance 160 until it receives confirmation that the data specified in the IO request has been persisted in the replica 422 for the data object 412 in the storage 480.

As described, the first data storage system 116 conducts synchronous replication with the second data storage system 416 on a per-data-object basis and in accordance with object-specific settings. The replication session manager 162 establishes these settings and orchestrates replication activities, recovery activities, and failover activities. In an example, the GUI application 164 provides an entry point to the replication session manger 162 to allow users to specify object-specific settings. In some examples, the GUI application is configured to accept user input for managing a wide range of operations of the data storage system 116, including configuring pools, configuring block-based objects, and configuring file-based objects, as well as for managing replication. Although particular aspects of the GUI application 164 are described herein in relation to replication, it is understood that the GUI application 164 may have a much greater scope than for controlling replication alone. For example, in some implementations, the GUI application 164 is a modified form of the Unisphere integrated management tool, available from EMC Corporation of Hopkinton, Mass. Providing the GUI application 164 within Unisphere simplifies the user experience by avoiding for the user to operate a separate GUI for controlling replication.

Figure 5:
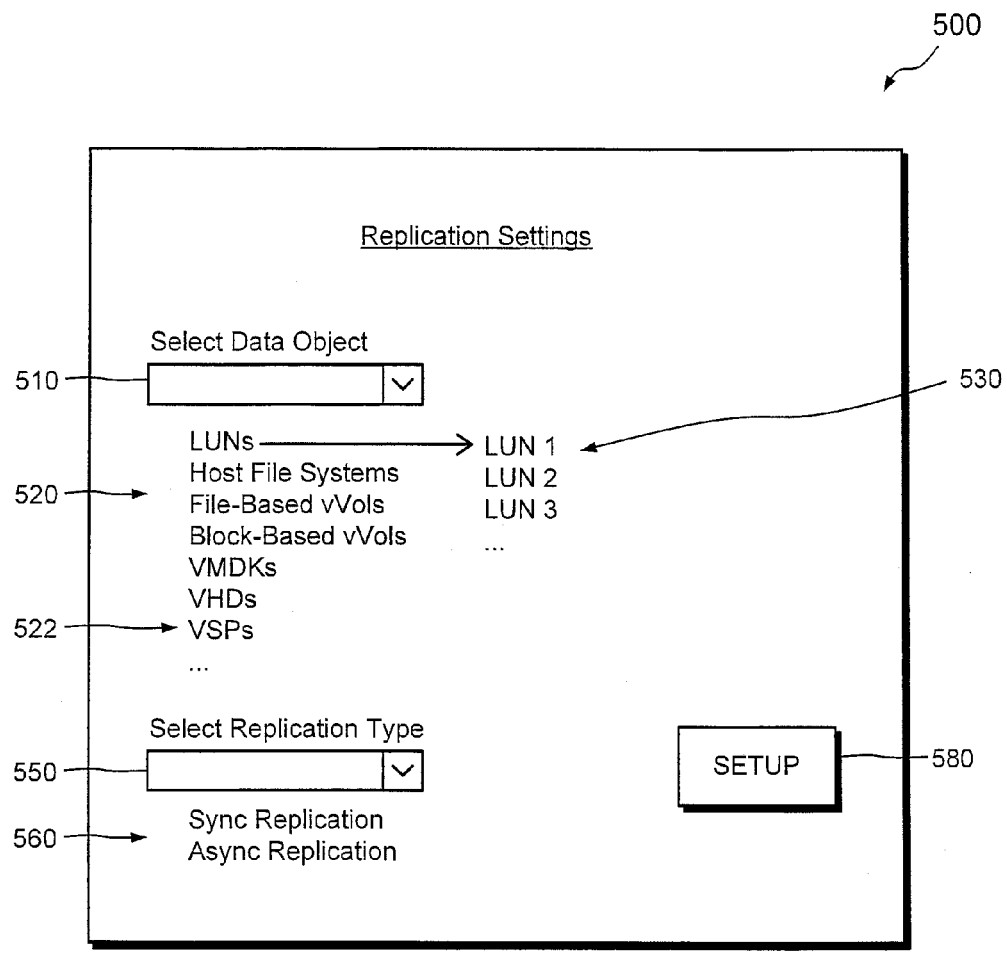
FIG. 5 is an example screen generated by a graphical user interface (GUI) application for establishing replication settings of data objects on a per-user-object basis.

FIG. 5 shows an example screen shot 500 of the GUI application 164 that allows users to specify object-specific replication settings. It is understood that the screen 500 is shown in simplified form and is intended to be merely illustrative. Here, the screen 500 includes a control 510 for selecting a desired data object. In an example, a user clicks the control 510 to reveal a list of available objects. The control 510 may organize the data objects in multiple levels, e.g., in a first level 520 that lists different types of data object (e.g., LUNs, Host File Systems, etc.) and in a second level 530 that lists particular data objects of a type the user selects from the first level 520 (e.g., LUN 1, LUN 2, etc.). In an example, the GUI application 164 queries the configuration database 170 and/or other databases to obtain lists of available data objects and stores such lists in connection with the control 510. A user may click the control 510 to display a list of object types objects in the first level 520. The user may then and click a desired type from the list displayed at first level 520 to cause the control 510 to display a list of data objects of the selected type in the second level 530. A different list is displayed in the second level 530 for each selection in the first level 520. The user may then click a particular listed data object to establish configuration settings for that object. For example, the user may click "LUNs" from the first level 520 and then click "LUN 2" from the second level 530 to configure settings for LUN 2.

The user may next click a control 550 to select a particular data protection operation. List 560 appears when the user clicks the control 550 and displays example options. These include, for example, "Synch Replication" for synchronous replication and "Async Replication" for asynchronous replication. The user may the click a button 580 ("SETUP") to configure settings for the selected replication type (selected via control 550) on the selected data object (selected via control 510).

Figure 6:
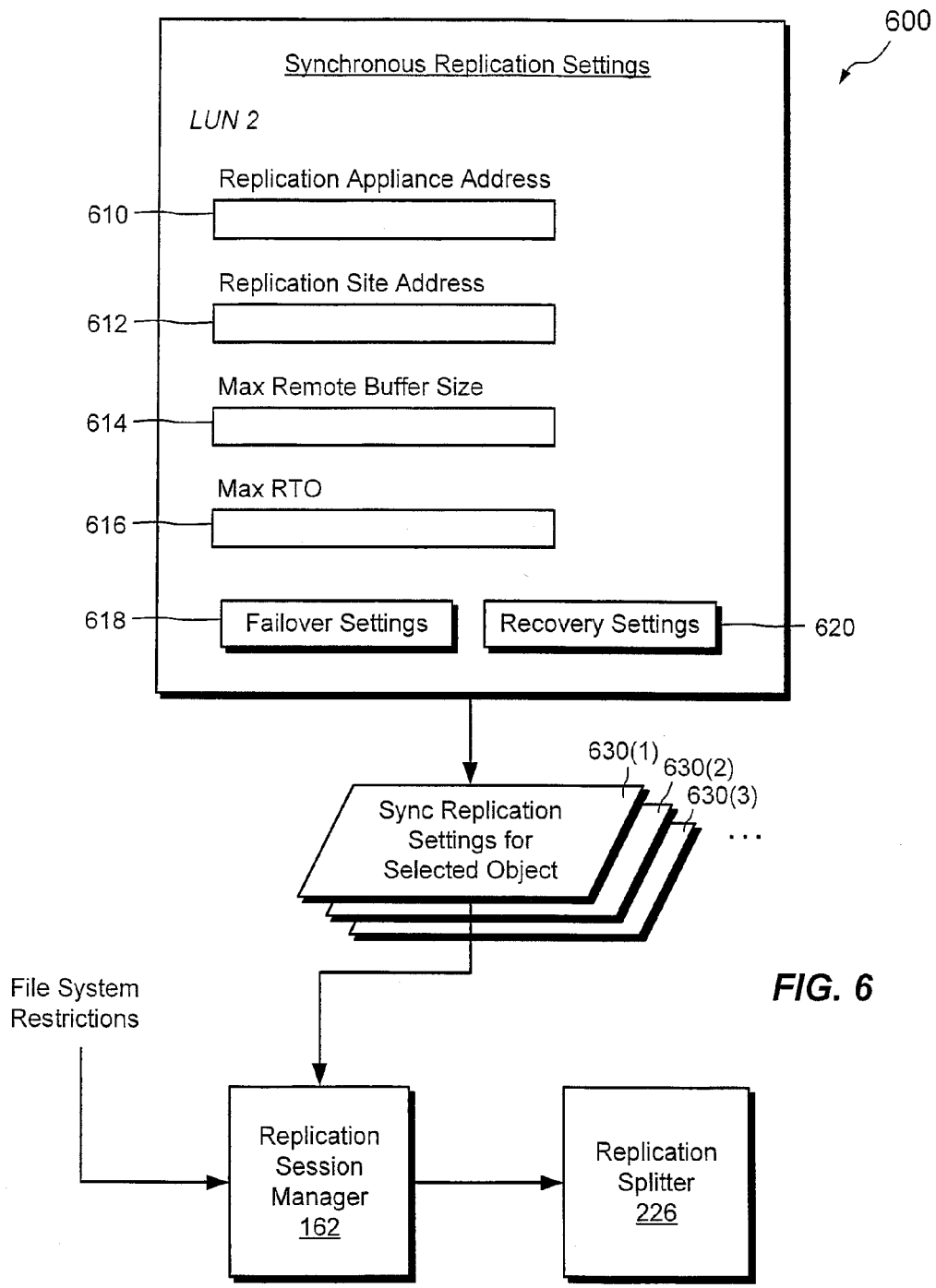
FIG. 6 is another example screen generated by the GUI application for establishing synchronous replication settings on a per-data-object basis.

FIG. 6 shows an example screen 600 of the GUI application 164, which the GUI application displays, for example, when the user selects "LUN 2" with the control 510 and selects "Sync Replication" from the control 550 (FIG. 5). The GUI application 164 thus accepts user input, via the screen 600, for establishing synchronous replication settings specific to LUN 2. It is understood that the screen 600 can be configured to accept settings for different data objects when the user selects them, e.g., using the control 510. Also, different screens may be displayed when the user selects different replication types (e.g., using the control 550).

The screen 600 accepts a number of different replication settings. These include, for example, the following settings:

Replication Appliance Address (610): The address (e.g., SCSI or IP address) of the replication appliance 160. Different replication appliance addresses may be provided for different data objects. For example, multiple replication appliances (like the appliance 160) may be connected to the data storage system 116 over a SAN (storage area network) or other network. Assigning different replication appliance addresses to different data objects causes different replication appliances to be used for replicating the respective objects. In some examples, replication appliances are arranged into clusters. In such cases, the Replication Appliance Address 610 may designate a cluster address. Where a cluster address is specified, the replication splitter 226 may select individual appliance units within a cluster based on load, for example.

Replication Site Address (612): The address (e.g., IP address) of a data storage system or a replication appliance at a second site. In the example of FIG. 4, the replication site address can be the address of the second replication appliance 460 or the address of an SP running on the second data storage system 416.

Max Remote Buffer Size (614): The maximum amount of data that may be stored in a buffer at the second site. In the example of FIG. 4, the Max Remote Buffer Size refers to the amount of data in the buffer 462 from IO requests 112 that have not yet been committed to the replica 422 in the storage 480. By setting Max Remote Buffer Size 614 to a large value, a considerable amount of time may be required to de-stage data to the replica 422 in the storage 480 to bring the replica 422 up to date with the data object at the first site 410. By setting Max Remote Buffer Size 614 to a small value, little time is needed to commit pending data, such that the replica 422 is kept nearly up to date with the original object at all times.

Max RTO (616): The maximum amount of time (Recovery Time Objective) that the data object may remain unavailable to hosts after the data object becomes unavailable at its source. In the example of FIG. 4, the Max RTO 616 is the maximum amount of time that is allowed to pass after a failure at the source before the replica of the data object in the storage 480 is brought up to date with the source and made available to hosts. In general, the more uncommitted IO requests that are pending in the buffer 462, the greater amount of time required to activate the replica. Therefore, an effective way to reduce RTO is set the Max Remote Buffer Size 614 to a small value. As Max RTO 616 is closely related to Max Remote Buffer Size 614, some implementations may not offer the option to control both.

The example settings 610, 612, 614, and 616 are shown for illustrative purposes. It is understood, however, that the particular settings shown are not necessarily required nor are they intended to represent all possible settings that may be desired.

The screen 600 is further seen to include buttons 618 and 620, for establishing failover settings and recovery settings, respectively, for the selected data object. In an example, clicking the button 618 brings up a failover screen (not shown) for accepting user input to establish failover settings for the data object. Failover settings may include, for example, an address of a failover site, a maximum allowable amount of data loss (RPO), a maximum RTO, as above, as well as other settings. Clicking the button 620 may bring up a recovery screen (not shown) for accepting user input to establish recovery settings for the selected data object. Recovery settings may include, for example, a recovery destination (e.g., a location to which a replica is to be restored), as well as maximum RPO and RTO settings to be applied for recovery operations.

Although the screens 500 and 600 have been shown and described in connection with a particular data object (LUN 2), it should be understood that similar screens may be presented for other LUNs, and for other types of data objects, with the screens 500 and 600 accepting user settings for any currently selected object. Thus, the GUI application 164 may be used for establishing replication, failover, and recovery settings on a per-data-object basis, with each data object having its own respective settings.

As further shown in FIG. 6, the GUI application 164 may generate output providing sync replication settings for the selected object. For example, the GUI application 164 may gather all user-established settings specified in the screens 500 and 600 (as well as any settings gathered from the failover screen and/or recovery screen) and provide such object-specific settings in an output file 630(1). Additional output files (e.g., 630(2), 630(3), . . . ) may be provided for other data objects, e.g., one per data object. It should be readily apparent, however, that object-specific settings may be stored in any suitable way, such as in different files (as shown), as a single file (e.g., an XML file), as records in a database, or in any number of other ways. In any case, the GUI application 164 sends the object-specific settings to the replication session manager 162, which receives the settings and applies them to establish replication sessions with replica sites for each data object in accordance with its respective settings. In this manner, the GUI application 164 may act as a single entry point to the replication session manager 162 for controlling replication on a per-object basis.

The replication session manager 162 may orchestrate any number of replication sessions at any given time, with each replication session operating to replicate a respective data object. For each replication session, the replication session manager 162 communicates with a respective replica site (e.g., with a counterpart replication session manager at the replica site) and coordinates replication activities in accordance with the object-specific settings. In the event of a failure at the data storage system 116 that renders a data object or the entire data storage system 116 unavailable, the replication session manager at the replica site can orchestrate failover and/or recovery operations in accordance with the same settings established in the replication session manager 162 on the data storage system 116.

As further shown in FIG. 6, the replication session manager 162 may also receive information describing file system restrictions. These restrictions may apply to upper-deck file systems. They may also apply to lower-deck file systems, i.e., to the file systems in which the file realizations of the data objects themselves are stored (FIGS. 2 and 3). Any of such file systems may operate subject to restrictions, such as restrictions prohibiting deletion prior to a certain date. These restrictions may include File Level Retention for compliance (FLR-C) and/or File Level Retention for enterprises (FLR-E). When restriction information is provided for a particular data object, the replication session manager 162 receives the information and includes it with the object-specific settings for the data object. When replication is conducted on the object, the replica site obtains the restriction information and applies the identified restrictions to the replica. The replica is thus made subject to the same restrictions as the original object.

Although the GUI application 164 accepts user input for establishing various replication settings for a data object, the replication session manager 162 may, in some examples, generate synchronous replication settings for a data object on its own, automatically, and without user input, and initiate a replication session for the data object with a destination object in accordance with the automatically generated settings. Thus, replication may proceed on a data object even if a user does nothing to establish replication settings.

Once the replication session manager 162 receives object-specific replication settings for a particular data object, the replication session manager 162 configures the replication splitter 226 (FIGS. 2-4) to operate in accordance with the settings for the respective object. In an example, the replication session manager 162 identifies a particular internal volume (FIGS. 2 and 3) in the IO stack 140 that the object-volume mapping 224 maps to the data object. The replication session manager 162 then activates the replication splitter 226 on the identified volume. Then, whenever the replication splitter 226 receives an IO request specifying data to be written to the internal volume mapped to the data object, the replication splitter 226 performs replication activities in accordance with the settings for the data object. These include, for example, sending the IO request to the replication appliance 160 designated in the settings for the object, configuring the buffer (e.g., 462), and so forth. Because the replication splitter 226 recognizes volumes and because the replication session manager 262 can identify the internal volume for each data object, the replication splitter 226 and the replication manager 260 can together manage replication on a per-data-object basis.

The above-described technique performs synchronous replication on both block-based objects and file-based objects. The technique may be used in connection with a data storage system 116 that internally stores data objects (e.g., LUNs, file systems, block-based vVOLs, file-based vVOLs, VMDKs, etc.) in the form of respective files (e.g., files 336, 346), such that each file provides a realization of a data object. The data storage system 116 maps each such file to a respective logical volume (e.g., 324, 326), and each logical volume provides a block-based interface. As the data storage system receives IO requests 112 (e.g., from hosts 110(1) to 110(N)) specifying data to be written to a data object, the data storage system 116 renders the IO requests as block-based requests, regardless of whether the IO requests are themselves block-based or file-based. A block-based replication splitter intercepts the block-based requests directed to the logical volumes and performs block-based, synchronous replication on the block-based requests, thereby achieving synchronous replication of both block-based objects and file-based objects in a single, unified architecture. The technique typically results in a reduced need for multiple, diverse replication solutions, and thus fewer items that must be purchased, learned, and maintained.

III) Synchronous and Asynchronous Replication of Block-Based and File-Based Objects:

Example techniques for performing asynchronous replication for both block-based objects and file-based objects are now described in connection with FIGS. 7-11. It is understood that the asynchronous replication techniques described in this section may be used independently of the synchronous techniques described in Section II above or may be used alongside such synchronous replication techniques. For example, the replication session manager 162 may establish settings for both synchronous and asynchronous replication for any given data object (LUN, file system, vVOL, etc.) and may conduct a synchronous replication session and an asynchronous replication session on the same data object or on different objects at the same time or at different times. For example, at the same time that synchronous replication proceeds on a data object in band with IO requests directed to the data object, asynchronous replication may also proceed, out of band with IO requests but on some timing schedule (hourly, daily, etc.) or in response to various events. It is understood that the asynchronous replication techniques described herein may be conducted in the same or a similar environment to that disclosed in Section I, i.e., in the same environment where the above-disclosed synchronous replication technique is performed.

As it does with synchronous replication, the replication session manager 162 establishes settings for performing asynchronous replication, orchestrates asynchronous replication sessions with replica sites, and orchestrates recovery and/or failover operations, all on a per-data-object basis. The same GUI application 164 accepts user input for configuring both synchronous and asynchronous settings and thus provides an entry point to the replication session manager 162 with respect to both synchronous and asynchronous replication.

Figure 7:
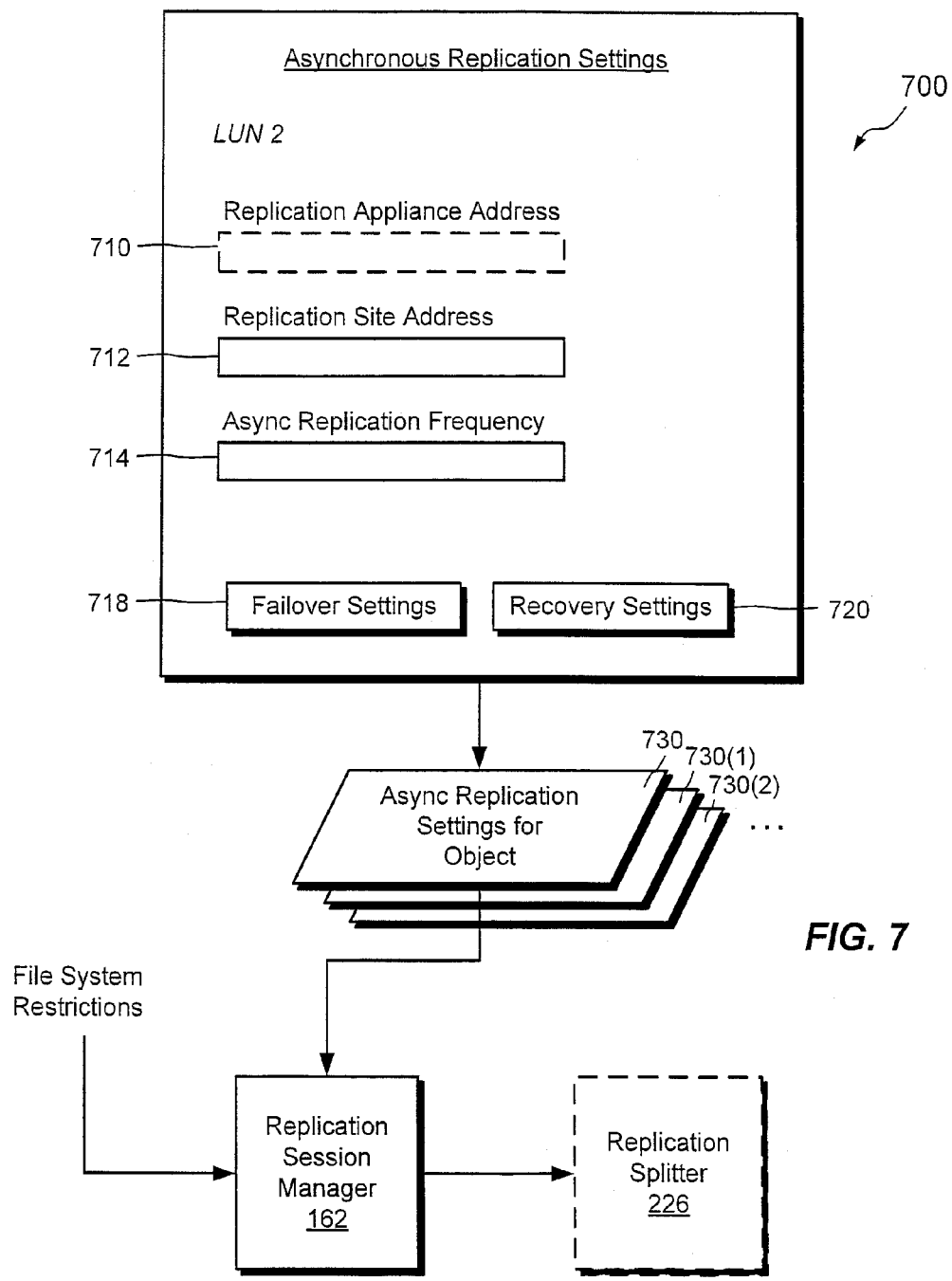
FIG. 7 is another example screen generated by the GUI application for establishing asynchronous replication settings on a per-user-object basis.

FIG. 7 shows an example screen 700 generated by the GUI application 164 for configuring asynchronous replication settings for data objects on a per-data-object basis. The GUI application 164 generates the screen 700, for example, when the user selects "LUN 2" with the control 510 and "Async Replication" with the control 550 (FIG. 5). The screen 700 thus collects user input for establishing asynchronous replication settings specific to LUN 2. The screen 700 is shown in simplified form and is intended to be merely illustrative.

Screen 700 accepts user input for a variety of settings, some of which may be similar to those presented in the screen 600. For example, the screen 700 accepts a setting 712 for Replication Site Address, which is similar to the setting 612 but specifies a site address for asynchronous replication. This site address may be the same as that specified for synchronous replication or it may be different. The screen 700 also presents buttons 718 and 720, which perform similar functions to those performed by the buttons 618 and 620, i.e., to establish failover settings and recovery settings, respectively. In some implementations, the screen 700 also accepts a setting 710, similar to the setting 610, for a Replication Appliance Address, which may be the same or different from any Replication Appliance Address 610 specified for synchronous replication. Although replication appliances have been described above in connection with synchronous replication, certain embodiments hereof also employ replication appliances for performing asynchronous replication. The screen 700 may also accept a setting 714 that allows a user to provide a desired Async Replication Frequency 714, i.e., how often to perform asynchronous replication operations. Example entries for setting 714 may include "Hourly," "Daily," and so on. The screen 700 may accept additional asynchronous settings (not shown), such as for designating events that trigger asynchronous replication activities.

Although the screen 700 has been shown and described in connection with a particular data object (LUN 2), it should be understood that similar screens may be presented for other LUNs, and for other types of data objects, with the screen accepting user settings for any currently selected object. Also, the example settings 710, 712, and 714 are shown for illustrative purposes. It is understood that the particular settings shown are not necessarily required nor are they intended to represent all possible settings that may be desired.

The screen 700 generates output that provides asynchronous replication settings for the selected object. For example, the GUI application 164 may gather all user-established settings specified in the screen 700 (as well as any settings gathered from the failover screen and/or recovery screen) and provide such object-specific settings in an output file 730(1). Additional output files (e.g., 730(2), 730(3), . . . ) may be provided for additional data objects, e.g., one per data object. However, object-specific settings may be stored in any suitable way, such as in different files (as shown), as a single file (e.g., an XML file), as records in a database, or in any number of other ways. Also, such records or files may be combined with those (e.g., 630(1), 630(2), . . . )) for storing synchronous replication settings in a single location or set of locations.

The GUI application 164 sends the object-specific settings to the replication session manager 162, which receives the settings and may apply them to establish asynchronous replication sessions with specified replica sites for each data object in accordance with its respective settings.

The replication session manager 162 may orchestrate any number of asynchronous replication sessions at any given time, with each asynchronous replication session operating to replicate a respective data object. Also, the replication session manager 162 may operate multiple asynchronous replication sessions on any data object simultaneously (e.g., for replicating the same object to different sites). For each asynchronous replication session, the replication session manager 162 communicates with a respective replica site (e.g., with a counterpart replication session manager at the replica site) and coordinates replication activities in accordance with the object-specific settings. In the event of a failure at the data storage system 116 that renders a data object or the entire data storage system 116 unavailable, the replication session manager at the replica site can orchestrate failover and/or recovery operations in accordance with the same settings established in the replication session manager 162 on the data storage system 116.

The replication session manager 162 may apply the information describing file system restrictions in a manner similar to that described above for synchronous replication. When the replication session manager 162 conducts asynchronous replication on a particular data object stored in a file system to which file system restrictions apply, the replication session manager 162 communicates the restriction information to the replica site, e.g., in the async replication settings for the object. The replica site then applies the identified restrictions to the replica. The replica is thus made to be subject to the same restrictions as the original object. Thus, restrictions are passed from the source to the replica for asynchronous replication in a manner similar to that described above for synchronous replication.

In a manner similar to that described above for synchronous replication, the replication session manager 162 may, in some examples, generate asynchronous replication settings for a data object on its own, automatically, and without user input, and initiate an asynchronous replication session for the data object with a destination object in accordance with the automatically generated settings. Thus, asynchronous replication may proceed on a data object even if a user does nothing to establish asynchronous replication settings.

The data storage system 116 may employ various techniques for effecting asynchronous replication. One technique operates by consuming snaps of the underlying files that realize the data objects. Another technique employs the replication splitter 226.

Figure 8:
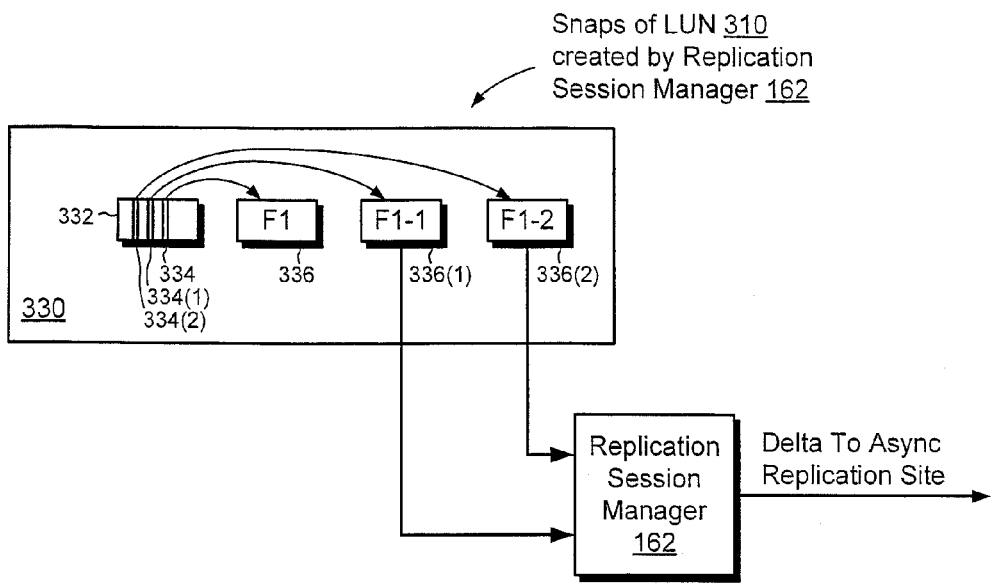
FIG. 8 is a block diagram showing an example technique for asynchronously replicating a LUN by consuming snaps.

FIG. 8 shows an example technique for effecting asynchronous replication of a LUN using snaps. Here, the replication session manager 162 has snapped the file 336 that realizes the LUN 310 (F1 from FIG. 3) to create a first snap 336(1) (F1-1) of the LUN 310 and a second snap 336(2) (F1-2) of the LUN 310. Like the LUN 310 itself, the snaps 336(1) and 336(2) are stored as files in the lower-deck file system 330. Also, in the same way that the file 336 has an inode 334 in the inode table 332 of the lower-deck file system 330, so too do the files 336(1) and 336(2) have inodes 334(1) and 334(2), respectively in the inode table 332.

On some predetermined schedule and/or in response to events as defined in the data-object-specific settings for the LUN 310, the replication session manager 162 creates new snaps of the LUN 310. Each time a new snap is taken, a new file 336(i) is created and a new inode 334(i) is allocated from the inode table 332. In an example, all snaps of the LUN 310 are stored in the lower-deck file system 330.

In the manner described above, the session manager 162 computes a difference between the two most recent snaps (here, 336(1) and 336(2)) and sends the difference to an asynchronous replication site, again as specified in the data-object-specific settings for the LUN 310. More generally, each time a new snap 336(*i*) is created, the asynchronous replication manager 1130 computes a new difference based on the most recent snap 336(*i*) and the immediately preceding snap 336(*i*−1) and sends the new difference to the asynchronous replication site.

The asynchronous replication technique shown in FIG. 8 is based on snapping files, regardless of the content of those files. Thus, although FIG. 8 shows an example of asynchronous replication of the LUN 310, it is understood that the same technique can be generalized to other data objects that are similarly represented as files in lower-deck file systems. Thus, the asynchronous replication technique of FIG. 8 can be used for asynchronously replicating not only LUNs, but also file systems, block-based vVOLs, file-based vVOLs, and other data objects.

Figure 9:
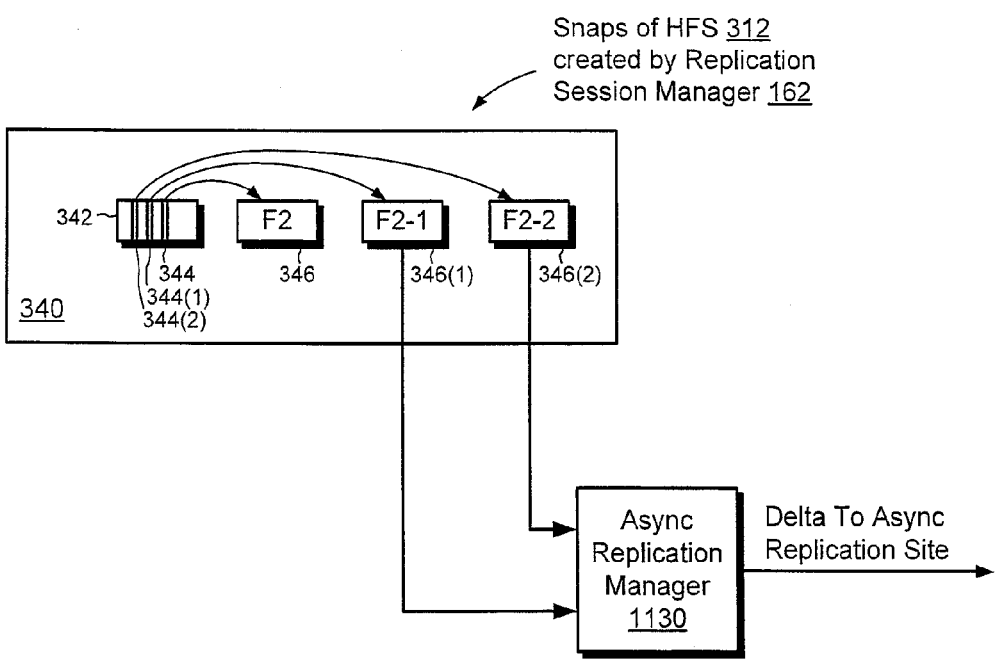
FIG. 9 is a block diagram showing an example technique for asynchronously replicating a host file system by consuming snaps.

For example, FIG. 9 shows an example technique for effecting asynchronous replication of an HFS using snaps. Here, the replication session manager 162 has snapped the file 346 that realizes the HFS 312 (F2 from FIG. 3) to create a first snap 346(1) (F2-1) of the HFS 312 and a second snap 346(2) (F2-2) of the HFS 312. Like the HFS 312 itself, the snaps 346(1) and 346(2) are stored as files in the lower-deck file system 340. Also, in the same way that the file 346 has an inode 344 in the inode table 342 of the lower-deck file system 340, so too do the files 346(1) and 346(2) have inodes 344(1) and 344(2), respectively in the inode table 342.

On some predetermined schedule and/or in response to events as defined in the data-object-specific settings for the HFS 312, the replication session manager 162 creates new snaps of the HFS 312. Each time a new snap is taken, a new file 346(*i*) is created and a new inode 344(*i*) is allocated from the inode table 342. In an example, all snaps of the HFS 312 are stored in the lower-deck file system 340.

The replication session manager 162 takes snaps of the HFS 312, computes a difference between snaps, and sends the difference to an asynchronous replication site, as specified in the data-object-specific settings for the HFS 312 and in a manner similar to that described for the LUN 310.

Figure 10:
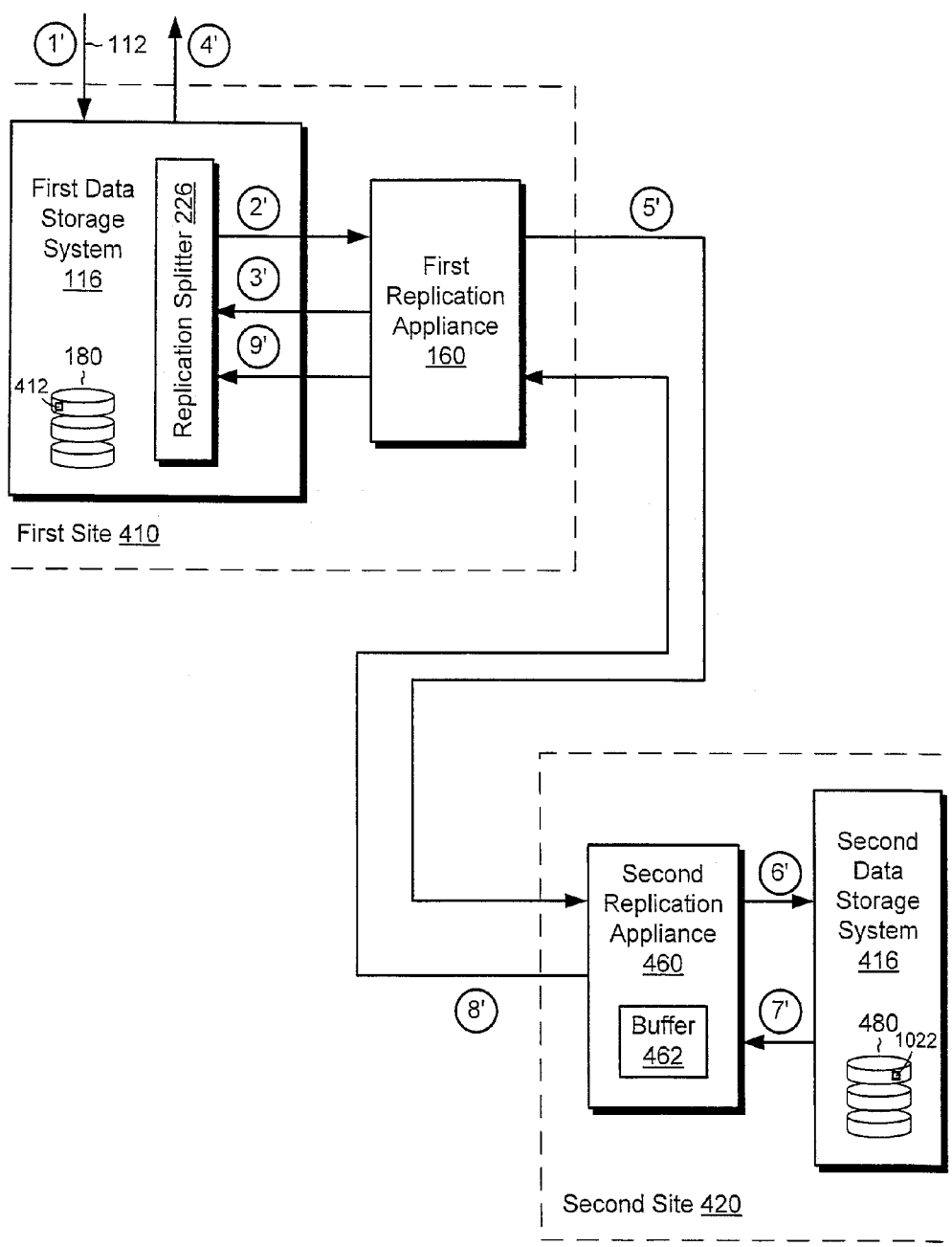
FIG. 10 is a block diagram showing an example technique for asynchronously replicating a data object using a replication splitter and replication appliance.

FIG. 10 shows an example technique for effecting asynchronous replication of a data object using the replication splitter 226. Here, the replication session manager 162 configures the replication splitter 226 (FIGS. 2-4) to operate in accordance with the data-object-specific settings for performing asynchronous replication on the data object. In an example, the replication session manager 162 identifies the internal volume (FIGS. 2 and 3) corresponding to the data object in the IO stack 140 and activates the replication splitter 226 on the identified volume. Then, whenever the replication splitter 226 receives an IO request specifying data to be written to the internal volume, the replication splitter 226 performs actions in accordance with the object-specific asynchronous settings for the data object. These settings may differ from those specified for synchronous replication, or in some circumstances may be the same.

In an example, the replication session manager 162 directs the replication splitter 226, in accordance with the object-specific settings, to intercept IO requests specifying writes to an object and to prevent them from propagating further down the IO stack 140 (FIG. 2) until the replication splitter 226 receives acknowledgements from the first replication appliance 160 (i.e., in a manner similar to actions performed for synchronous replication). In this case, however, the first replication appliance 160 has been configured in accordance to the object-specific settings to provide acknowledgements as soon as it persists the specified data locally, e.g., in the appliance 160 itself. The first replication appliance 160 accumulates data from the replication splitter 226 and sends them to the second site 420 on a regular basis and/or upon the occurrence of specified events, i.e., in accordance with the data-object-specific settings for the object.

The encircled numbers in FIG. 10 show an example sequence for performing asynchronous replication. At (1'), the first data storage system 116 receives an IO request 112 from a host (e.g., one of 110(1-N)). The IO request 112 specifies data to be written to a particular data object, e.g., the data object 412 in the storage 180. The IO request 112 propagates down the IO stack 140 (FIG. 2) and reaches the replication splitter 226.

At (2'), the replication splitter 226, acting in accordance with the object-specific asynchronous replication settings for the object 412, mirrors the IO request 112 (i.e., a block-based form thereof) to the first replication appliance 160. The replication splitter 226 also prevents the IO request from propagating further down the IO stack 140.

At (3'), the first replication appliance 160 sends an acknowledgement to the replication splitter 226, confirming that it has received and persisted the data specified in the IO request. In response to receiving the acknowledgement, the replication splitter 226 allows the IO request to continue propagating down the IO stack 140 to effect writing of the data specified in the IO request 112 to the storage 180.

At (4'), the first data storage system 116 sends an acknowledgement back to the host that originated the IO request 112, confirming that the IO request 112 has been processed.

At (5'), which may occur at some later time after the first replication appliance 160 has accumulated data from multiple IO requests, the first replication appliance 160 sends the accumulated data to the second replication appliance 460 at the second site 420. the second replication appliance 460 stores the data in the buffer 462.

At (6'), the second replication appliance 160 sends the data to the second data storage system 416, which writes the data to a replica 1022. The replica 1022 is a replica of the object 422 generated via asynchronous replication and thus may differ from the replica 422 (FIG. 4) generated by synchronous replication.

At (7'), the data storage system 416 acknowledges to the second replication appliance 460 that the replica 1022 has been written, and at (8'), the second replication appliance 460 sends an acknowledgement back to the first replication appliance 160.

The above sequence can be repeated on a regular basis and/or in response to particular events, as specified in the data-object-specific settings, to ensure that the state of the replica 1022 does not fall far behind that of the object 412. Of course, the above sequence may also be used for asynchronously replicating other data objects.

Many variants of this asynchronous replication sequence are contemplated. According to one variant, the replication session manager 162 may direct the replication splitter 226 in accordance with data-object-specific settings to mirror IO requests specifying writes to the first replication appliance 160 (or to some other appliance) without holding back the IO requests until acknowledgements are received. Thus, the first data storage system 116 may process IO requests in the usual way, with the replication splitter 226 operating to mirror IO requests but not to intercept them.

The above-described technique manages synchronous replication and asynchronous replication of both block-based objects and file-based objects via a common replication session manager 162 configured from a common GUI application 164. The replication session manager 162 can access different settings for different data objects (e.g., LUNs, file systems, block-based vVOLs (virtual volumes), file-based vVOLs, VMDKs, etc.), with replication settings maintained on a per-data-object basis. The replication session manager can also orchestrate synchronous and/or asynchronous replication sessions, failover, and/or recovery, for any given data object in accordance with the particular settings established for that object.

IV) Synchronous Replication of Virtualized Storage Processors (VSPs):

Example techniques for performing synchronous replication of VSPs are now described in connection with FIGS. 11-13. It is understood that the techniques disclosed in this section are consistent with those described in Section II above for synchronous replication of data objects and may be performed in the same or a similar environment to that disclosed in Section I, i.e., in the same environment where the above-disclosed synchronous replication techniques are performed.

Figure 11:
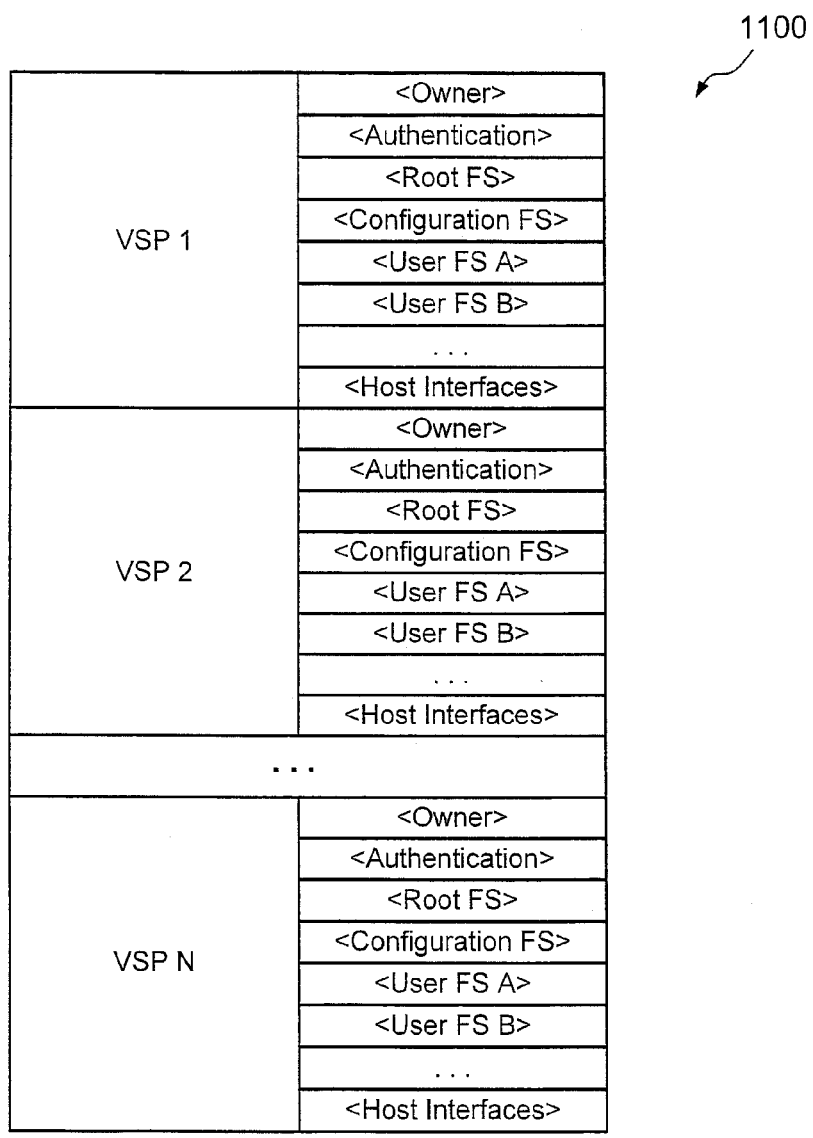
FIG. 11 is a block diagram showing example records of a configuration database that associates VSPs with data objects.

FIG. 11 shows an example set of records 1100 of the configuration database 170 (FIG. 1), which provide definitions for VSPs 1-N. For each VSP, a record specifies an owning SP, authentication information, and identifiers of data objects (e.g., file systems) associated with the respective VSP, including identifiers of internal file systems (e.g., a root file system and a configuration file system) and various user file systems or other data objects. The record may further specify various host interfaces that define host IO protocols that the respective VSP is equipped to handle. The record for each VSP thus identifies not only data objects associated with the VSP, but also a set of interfaces and settings that form a "personality." This personality enables the VSP to interact with hosts in a manner similar to the way a physical storage processor interacts with hosts.

In operation, VSPs are instantiated on the owning SP by starting their respective host interfaces. The interfaces for each VSP can respond to host IO requests for reading and writing the data objects of the respective VSP, which are stored in the storage 180.

Referring briefly back to FIG. 5, which shows a screen 500 displayed by the GUI application 164, it is seen that one of the types of objects that a user may select for configuring replication via the control 510 are "VSPs." For example, a user may click "VSPs" at the first level 520 for control 510, in response to which the control 510 displays a list of available VSPs in the second level 530, similar to the manner in which a list of LUNs is displayed in the example of FIG. 5. The user may then click a particular VSP, e.g., "VSP 1," to select VSP 1 as the object on which to configure replication. The user may then operate the control 520 to select "Sync Replication" and click the "SETUP" button 580. In response, the GUI application 164 displays a screen like the screen 600 of FIG. 6, but which is tailored to VSP 1. The user may then establish VSP-specific synchronous replication settings for VSP 1, by providing input to the controls 610, 612, 614, and 616, for example. The user may also click the buttons 618 and 620 to establish failover settings and recovery settings, respectively, for VSP 1, e.g., in a manner similar to that described for "LUN 2" in connection with FIG. 5 in Section II above.

The GUI application 164 may store settings for VSP 1 in a file 630(1) or in some other data structure. Settings for other VSPs may be stored in other files or structures (e.g., 630(2), 630(3), . . . ), i.e., on a per-VSP basis.

The GUI application 164 sends the VSP-specific settings (e.g., the file 630(1) for VSP 1) to the replication session manager 162, which receives the settings and applies them to establish replication sessions for each data object associated with the VSP in accordance with the VSP-specific settings. For example, the replication session manager 162 queries the configuration database 170 to obtain the record for VSP 1, which provides a list of all of the data objects associated with VSP 1. The replication session manager 162 then initiates a synchronous replication session for each of the data objects specified in the record, with the replication session for each data object conducted in accordance with the settings established for VSP 1. For operational reasons and in some examples, the replication session manager may exclude the root file system for a VSP from replication, i.e., no replication session is conducted for the root file system. Rather, a new root file system containing site-specific information may be constructed for a VSP at the replica site. Similar operations may be repeated for other VSPs, e.g., for VSP 2, VSP 3, etc., using the VSP-specific settings for those VSPs.

The replication session manager 162 thus handles the complexity of establishing settings for large numbers of individual data objects by receiving one set of settings for a VSP and applying the settings across all of the data objects associated with the VSP. If a VSP is associated with 100 different data objects, synchronous replication for all 100 objects can be handled by establishing one set of settings. The administrative burden of managing replication for large numbers of data objects is thus greatly reduced.

The replication session manager 162 may orchestrate any number of replication sessions for a VSP, or for multiple VSPs, at any given time, with each replication session operating to replicate a respective set of data objects. For each replication session operated for a VSP, the replication session manager 162 communicates with a replica site (e.g., with a counterpart replication session manager at the replica site) and coordinates replication activities in accordance with the VSP-specific settings. In the event of a failure at the data storage system 116 that renders the VSP or the entire data storage system 116 unavailable, the replication session manager at the replica site can orchestrate failover and/or recovery operations on each data object associated with the VSP in accordance with the same VSP-specific settings established in the replication session manager 162 on the data storage system 116.

As the replication session manager 162 conducts replication sessions for a VSP, the replication session manager 162 can receive information describing file system restrictions that apply to individual data objects associated with the VSP on a per-data-object basis and provide such information to the replica site. The replica site then applies the identified restrictions to the replica. The replica for each data object of a VSP is thus made subject to the same restrictions as the original object.

Although the GUI application 164 accepts user input for establishing various replication settings for a VSP, the replication session manager 162 may, in some examples, generate synchronous replication settings for a VSP on its own, automatically, and without user input, and initiate a replication session on each data object of the VSP with a respective destination object in accordance with the automatically generated, VSP-specific settings. Thus, replication may proceed for a VSP even if a user does nothing to establish replication settings.

Once the replication session manager 162 receives synchronous replication settings for a particular VSP, the replication session manager 162 configures the replication splitter 226 (FIGS. 2-4) to operate in accordance with the settings for that VSP. In an example, the replication session manager 162 identifies an internal volume (FIGS. 2 and 3) in the IO stack 140 that the object-volume mapping 224 maps to each data object associated with the VSP. The replication session manager 162 then activates the replication splitter 226 on the identified volumes. Then, whenever the replication splitter 226 receives an IO request specifying data to be written to any of the internal volumes mapped to the data objects of the VSP, the replication splitter 226 performs replication activities in accordance with the VSP-specific settings. These include, for example, sending the IO request to the replication appliance 160 designated in the VSP-specific settings, configuring the buffer (e.g., 462), and so forth. Because the replication splitter 226 recognizes volumes and because the replication session manager 262 can identify the internal volumes for all of the data objects of a VSP, the replication splitter 226 and the replication manager 260 can together manage replication on a per-VSP basis. This operation can be more fully understood with reference to FIG. 12.

Figure 12:
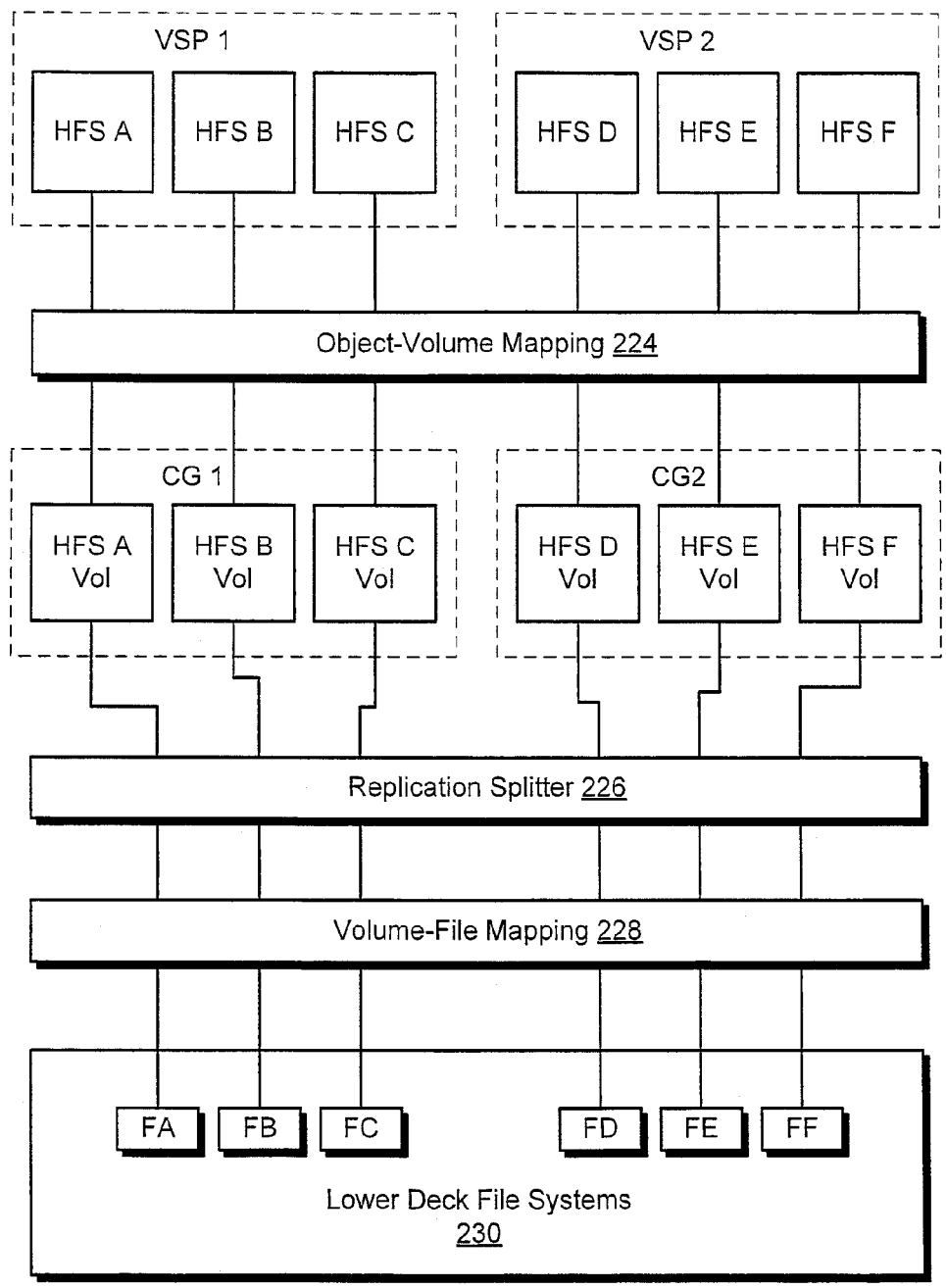
FIG. 12 is a block diagram of an IO stack of the data storage system of FIG. 1, which associates data objects of particular VSPs with respective consistency groups.

FIG. 12 shows a view of the IO stack 140 in which VSPs are associated with consistency groups. The mapping shown in FIG. 12 of lower-deck files to data objects is similar to that shown in FIGS. 2 and 3, except that FIG. 12 shows data objects organized in VSPs and logical volumes organized in consistency groups. Here, the volume-file mapping 228 maps lower-deck files FA, FB, and FC to respective logical volumes HFS A Vol, HFS B Vol, and HFS C Vol. The volume-file mapping 228 also maps lower-deck files FD, FE, and FF to respective logical volumes HFS D Vol, HFS E Vol, and HFS F Vol. The object-volume mapping 224 then maps logical volumes HFS A Vol through HFS F Vol to respective host (upper-deck) file systems HFS A through HFS F. In this example, the host file systems HFS A, HFS B, and HFS C belong to a first VSP (VSP 1), and the host file systems HFS D, HFS E, and HFS F belong to a second VSP (VSP 2).

Once the replication session manager 162 has received VSP-specific replication settings for VSP 1, the replication session manager 162 identifies each data object associated with VSP 1 (e.g., by accessing the records 1100 for VSP 1). The replication session manager 162 also identifies the logical volume that corresponds to each data object associated with VSP 1. In an example, the replication session manager 162 obtains logical volume identities from a driver that manages the IO stack 140 or a portion thereof. The replication session manager 162 may perform similar activities for VSP 2.

In an example, the replication session manager 162 directs the replication splitter 226 to form a first consistency group CG 1 from the logical volumes that correspond to the data objects of VSP 1, i.e., HFS A Vol, HFS B Vol, and HFS C Vol. Similarly, the replication session manager 162 directs the replication splitter 226 to form a second consistency group CG 2 from the logical volumes that correspond to the data objects of VSP 2, i.e., HFS D Vol, HFS E Vol, and HFS F Vol. The replication session manager 162 then activates the replication splitter 226 to perform synchronous replication operations on a per-consistency-group basis. In particular, the replication session manager 162 activates the replication splitter 226 to operate in accordance with a first set of synchronous replication settings for logical volumes belonging to CG 1 and to operate in accordance with a second set of synchronous replication settings for logical volumes belonging to CG 2, where the first set of synchronous replication settings are those specified for VSP 1 and the second set of replication settings are those specified for VSP 2. Since the volumes of CG 1 correspond to the data objects of VSP 1 and the volumes of CG 2 correspond to the data objects of VSP 2, the replication splitter 226 is made to operate on a per-VSP basis. Thus, as IO requests are received specifying data to be written to any data object of VSP 1, the replication splitter performs synchronous replication actions in accordance with the VSP-specific settings for VSP 1. Similarly, as IO requests are received specifying data to be written to any data object of VSP 2, the replication splitter performs synchronous replication actions in accordance with the VSP-specific settings for VSP 2.

With the replication splitter 226 configured according to VSP-specific settings, synchronous replication of data objects proceeds substantially as described in connection with FIG. 4 in Section II above, i.e., by rendering each IO request 112 as a block-based request, mirroring the block-based request to a replication appliance, and preventing the request from propagating further down the IO stack 140 until the replication appliance acknowledges that the data specified in the block-based request have been persisted at the remote site.

Figure 13:
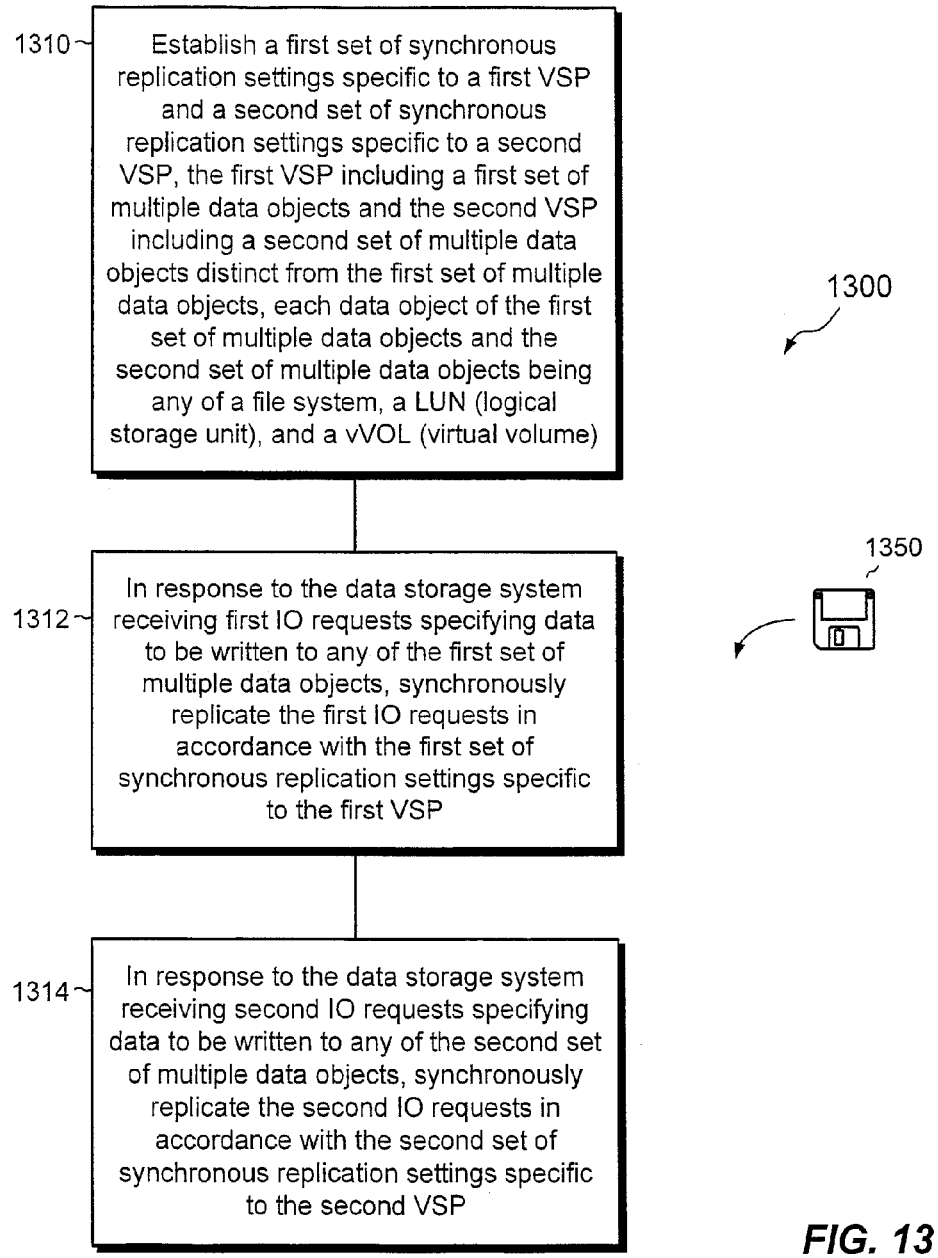
FIG. 13 is a flowchart showing an example method for managing synchronous replication of VSPs in the data storage system of FIG. 1.

FIG. 13 shows an example process 1300 for managing synchronous replication of VSPs (Virtualized Storage Processors) in a data storage system. The method 1300 may be carried out, for example, in connection with the data storage apparatus 116, such as by the software constructs described in connection with FIGS. 1-3, which reside in the memory 130 of the storage processor 120 and are run by the set of processing units 124. The various acts of the method 1300 may be ordered in any suitable way. Accordingly, embodiments may be constructed in which acts are performed in orders different from those illustrated, which may include performing some acts simultaneously, even though the acts are shown as sequential in the illustrated embodiments.

At step 1310, a first set of synchronous replication settings specific to a first VSP and a second set of synchronous replication settings specific to a second VSP are established. The first VSP includes a first set of multiple data objects, and the second VSP includes a second set of multiple data objects distinct from the first set of multiple data objects. Each data object of the first set of multiple data objects and the second set of multiple data objects is any of a file system, a LUN (logical storage unit), and a vVOL (virtual volume). For example, the GUI application 164 can accept synchronous replication settings for a first VSP (VSP 1) and a second VSP (VSP 2), each of which include multiple data objects (as shown, for example, in FIG. 12).

At step 1312, and in response to the data storage system receiving first IO requests specifying data to be written to any of the first set of multiple data objects, the first IO requests are synchronously replicated in accordance with the first set of synchronous replication settings specific to the first VSP. For example, the replication session manager 162 configures the IO stack 140, as described in connection with FIG. 12, to respond to IO requests directed to data objects associated with VSP 1 according to the VSP-specific settings for VSP 1.

At step 1314, and in response to the data storage system receiving second IO requests specifying data to be written to any of the second set of multiple data objects, the second IO requests are synchronously replicated in accordance with the second set of synchronous replication settings specific to the second VSP. For example, the replication session manager 162 configures the IO stack 140, as described in connection with FIG. 12, to respond to IO requests directed to data objects associated with VSP 2 according to the VSP-specific settings for VSP 2.

An improved technique has been described for managing replication of VSPs (Virtualized Storage Processors). Replication proceeds on a per-VSP basis by (i) identifying the data objects associated with a VSP, (ii) establishing a common set of replication settings across all of the data objects associated with the VSP, and (iii) replicating the VSP by replicating each of the identified data objects associated with the VSP in accordance with the common set of replication settings established across all of the data objects associated with the VSP.

The improved technique avoids the need for administrators to separately configure and manage replication on large numbers of individual data objects and thus reduces administrative burdens.

As used throughout this document, the words "comprising," "including," and "having" are intended to set forth certain items, steps, elements, or aspects of something in an open-ended fashion. Although certain embodiments are disclosed herein, it is understood that these are provided by way of example only and the invention is not limited to these particular embodiments. In addition, the word "set" as used herein indicates one or more of something, unless a statement is made to the contrary.

Having described certain embodiments, numerous alternative embodiments or variations can be made. For example, although synchronous replication of VSPs has been shown and described, it can readily be seen that the asynchronous replication techniques disclosed herein may be used for performing asynchronous replication of VSPs in an analogous manner. Such techniques may include (i) identifying data objects associated with a VSP, (ii) establishing a common set of asynchronous replication settings across all of the data objects associated with the VSP, and (iii) asynchronously replicating the VSP by asynchronously replicating each of the identified data objects associated with the VSP in accordance with the common set of asynchronous replication settings established across all of the data objects associated with the VSP Also, the improvements or portions thereof may be embodied as a non-transient computer-readable storage medium, such as a magnetic disk, magnetic tape, compact disk, DVD, optical disk, flash memory, Application Specific Integrated Circuit (ASIC), Field Programmable Gate Array (FPGA), and the like (shown by way of example as medium 1350 in FIG. 13). Multiple computer-readable media may be used. The medium (or media) may be encoded with instructions which, when executed on one or more computers or other processors, perform methods that implement the various processes described herein. Such medium (or media) may be considered an article of manufacture or a machine, and may be transportable from one machine to another.

Further, although features are shown and described with reference to particular embodiments hereof, such features may be included in any of the disclosed embodiments and their variants. Thus, it is understood that features disclosed in connection with any embodiment can be included as variants of any other embodiment, whether such inclusion is made explicit herein or not.

Those skilled in the art will therefore understand that various changes in form and detail may be made to the embodiments disclosed herein without departing from the scope of the invention.

What is claimed is:

1. A method of managing synchronous replication of VSPs (Virtualized Storage Processors) in a data storage system, comprising:
   establishing a first set of synchronous replication settings specific to a first VSP and a second set of synchronous replication settings specific to a second VSP, the first VSP including a first set of multiple data objects and the second VSP including a second set of multiple data objects distinct from the first set of multiple data objects, each data object of the first set of multiple data objects and the second set of multiple data objects being any of a file system, a LUN (logical storage unit), and a vVOL (virtual volume);
   in response to the data storage system receiving first IO requests specifying data to be written to any of the first set of multiple data objects, synchronously replicating the first IO requests in accordance with the first set of synchronous replication settings specific to the first VSP; and
   in response to the data storage system receiving second IO requests specifying data to be written to any of the second set of multiple data objects, synchronously replicating the second IO requests in accordance with the second set of synchronous replication settings specific to the second VSP.

2. The method of claim 1, further comprising running a replication session manager to manage synchronous replication on a per-VSP basis.

3. The method of claim 2, further comprising the replication session manager:
   operating a synchronous replication session on each of the first set of multiple data objects in accordance with the first set of synchronous replication settings specific to the first VSP; and
   operating a synchronous replication session on each of the second set of multiple data objects in accordance with the second set of synchronous replication settings specific to the second VSP.

4. The method of claim 3, further comprising the replication session manager:
   accessing a database that associates VSPs with data objects;
   receiving from the database a first list of data objects associated with the first VSP, the first list of data objects identifying the first set of multiple data objects; and
   receiving from the database a second list of data objects associated with the second VSP, the second list of data objects identifying the second set of multiple data objects.

5. The method of claim 3, further comprising:
   establishing a first set of recovery settings specific to the first VSP; and
   establishing a second set of recovery settings specific to the second VSP.

6. The method of claim 4, further comprising:
   establishing a first set of failover settings specific to the first VSP; and
   establishing a second set of failover settings specific to the second VSP.

7. The method of claim 6, further comprising accepting user input for establishing the first and second sets of synchronous replication settings via a GUI (Graphical User Interface) application that serves as an entry point to the replication session manager.

8. The method of claim 3, further comprising:
   grouping the first set of multiple data objects into a first consistency group;
   grouping the second set of multiple data objects into a second consistency group;
   configuring a replication splitter in an IO stack of the data storage system to (i) respond to IO requests specifying data to be written to any data object in the first consistency group in accordance with the first set of synchronous replication settings and (ii) respond to IO requests specifying data to be written to any data object in the second consistency group in accordance with the second set of synchronous replication settings,
   wherein synchronously replicating the first IO requests includes, for each of the first IO requests (i) the replication splitter receiving the first IO request, (ii) the replication splitter sending the first IO request to a replication appliance specified in the first set of synchronous replication settings, (iii) the replication splitter receiving an acknowledgement from the replication appliance in response to the first IO request to indicate that the first IO request has been persisted at a replication site, and (iv) processing the first IO request to effect a write operation on the data storage system, and wherein synchronously replicating the second IO requests includes, for each of the second IO requests, (i) the replication splitter receiving the second IO request, (ii) the replication splitter sending the second IO request to a replication appliance specified in the second set of synchronous replication settings, (iii) the replication splitter receiving an acknowledgement from the replication appliance specified in the second set of synchronous replication settings in response to the second IO request to indicate that the second IO request has been persisted at a replication site, and (iv) processing the second IO request to effect a write operation on the data storage system.

9. The method of claim 8, further comprising:
storing, in the data storage system, each of the first set of multiple data objects and each of the second set of multiple data objects in the form of a respective file that provides a realization of the respective data object; and
mapping each respective file to a respective logical volume;
wherein grouping the first set of multiple data objects into the first consistency group is effected by grouping into the first consistency group the local volumes to which the files that realize the first set of multiple data objects are mapped,
wherein grouping the second set of multiple data objects into the second consistency group is effected by grouping into the second consistency group the local volumes to which the files that realize the second set of multiple data objects are mapped, and
wherein the method further comprises the replication splitter (i) recognizing a logical volume to which each of the first IO requests and each of the second IO requests is directed, (ii) applying the first set of replication settings to IO requests directed to logical volumes that belong to the first consistency group, and (iii) applying the second set of replication settings to IO requests directed to logical volumes that belong to the second consistency group.

10. The method of claim 3, further comprising the replication session manager establishing settings for performing synchronous replication of a VSP automatically and without user input for establishing the settings.

11. The method of claim 1,
wherein the first VSP further includes a collection of network servers that provide the first VSP with its own network identity, and
wherein the second VSP further includes a collection of network servers that provide the second VSP with its own network identity distinct from the network identity of the first VSP.

12. The method of claim 11,
wherein each of the first set of multiple data objects included in the first VSP is a file system, and
wherein each of the second set of multiple data objects included in the second VSP is a file system.

13. The method of claim 1, further comprising:
grouping the first set of multiple data objects into a first consistency group;
grouping the second set of multiple data objects into a second consistency group; and
configuring an IO stack of the data storage system to (i) respond to IO requests specifying data to be written to any data object in the first consistency group in accordance with the first set of synchronous replication settings and (ii) respond to IO requests specifying data to be written to any data object in the second consistency group in accordance with the second set of synchronous replication settings.

14. A data storage apparatus, comprising a set of processing units and memory, the memory coupled to the set of processing units, the memory storing instructions for performing a method of managing synchronous replication of VSPs (Virtualized Storage Processors) in a data storage system, the set of processing units and the memory together forming a controller constructed and arranged to:
establish a first set of synchronous replication settings specific to a first VSP and a second set of synchronous replication settings specific to a second VSP, the first VSP including a first set of multiple data objects and the second VSP including a second set of multiple data objects distinct from the first set of multiple data objects, each data object of the first set of multiple data objects and the second set of multiple data objects being any of a file system, a LUN, and a vVol (virtual volume);
in response to the data storage system receiving first IO requests specifying data to be written to any of the first set of multiple data objects, synchronously replicate the first IO requests in accordance with the first set of synchronous replication settings specific to the first VSP; and
in response to the data storage system receiving second IO requests specifying data to be written to any of the second set of multiple data objects, synchronously replicate the second IO requests in accordance with the second set of synchronous replication settings specific to the second VSP.

15. The data storage apparatus of claim 14, wherein the controller is further constructed and arranged to run a replication session manager to manage synchronous replication on a per-VSP basis, and wherein the controller is further constructed and arranged to operate the replication session manager to:
operate a synchronous replication session on each of the first set of multiple data objects in accordance with the first set of synchronous replication settings specific to the first VSP; and
operate a synchronous replication session on each of the second set of multiple data objects in accordance with the second set of synchronous replication settings specific to the second VSP.

16. The data storage apparatus of claim 15, wherein the controller is further constructed and arranged to:
group the first set of multiple data objects into a first consistency group;
group the second set of multiple data objects into a second consistency group;
configure a replication splitter in an IO stack of the data storage system to (i) respond to IO requests specifying data to be written to any data object in the first consistency group in accordance with the first set of synchronous replication settings and (ii) respond to IO requests specifying data to be written to any data object in the second consistency group in accordance with the second set of synchronous replication settings, wherein the controller, when constructed and arranged to synchronously replicate the first IO requests, is further constructed and arranged to, for each of the first IO requests (i) operate the replication splitter to receive the first IO request, (ii) operate the replication splitter to send the first IO request to a replication appliance specified in the first set of synchronous replication settings, (iii) operate the replication splitter to receive an acknowledgement from the replication appliance in response to the first IO request to indicate that the first IO request has been persisted at a replication site, and (iv) process the first IO request to effect a write operation on the data storage system, and wherein the controller, when constructed and arranged to synchronously replicate the second IO requests, is further constructed and arranged to, for each of the second IO requests, (i) operate the replication splitter to receive the second IO request, (ii) operate the replication splitter to send the second IO request to a replication appliance specified in the second set of synchronous replication settings, (iii) operate the replication splitter to receive an acknowledgement from the replication appliance specified in the second set of synchronous replication settings in response to the second IO request to indicate that the second IO request has been persisted at a replication site, and (iv) process the second IO request to effect a write operation on the data storage system.

17. The data storage apparatus of claim 16, wherein the controller is further constructed and arranged to:

store, in the data storage system, each of the first set of multiple data objects and each of the second set of multiple data objects in the form of a respective file that provides a realization of the respective data object; and map each respective file to a respective logical volume;

wherein to group the first set of multiple data objects into the first consistency group is effected by grouping into the first consistency group the local volumes to which the files that realize the first set of multiple data objects are mapped, wherein to group the second set of multiple data objects into the second consistency group is effected by grouping into the second consistency group the local volumes to which the files that realize the second set of multiple data objects are mapped, and wherein the controller is further constructed and arranged to operate the replication splitter to (i) recognize a logical volume to which each of the first IO requests and each of the second IO requests is directed, (ii) apply the first set of replication settings to IO requests directed to logical volumes that belong to the first consistency group, and (iii) apply the second set of replication settings to IO requests directed to logical volumes that belong to the second consistency group.

18. The data storage apparatus of claim 15, wherein the controller is further constructed and arranged to operate the replication session manager to establish settings for performing synchronous replication of a VSP automatically and without user input for establishing the settings.

19. A computer program product having a non-transitory computer-readable medium including instructions which, when executed by a controller of a data storage apparatus, cause the controller to perform a method of managing synchronous replication of VSPs (Virtualized Storage Processors) in a data storage system, the method comprising:

establishing a set of synchronous replication settings specific to a VSP, the VSP including a set of multiple data objects, each data object of the set of multiple data objects being any of a file system, a LUN, and a vVol (virtual volume);

in response to the data storage system receiving IO requests specifying data to be written to any of the set of multiple data objects, synchronously replicating the IO requests in accordance with the set of synchronous replication settings specific to the VSP.

20. The computer program product of claim 19, wherein the method further comprises running a replication session manager to manage synchronous replication on a per-VSP basis, the replication manager establishing a synchronous replication session on each of the set of multiple data objects in accordance with the set of synchronous replication settings specific to the first VSP.

21. The computer program product of claim 20, wherein the method further comprises the replication session manager:

accessing a database that associates VSPs with data objects;

receiving from the database a list of data objects associated with the VSP, the list of data objects identifying the set of multiple data objects.

22. The computer program product of claim 21, wherein the method further comprises:

establishing a set of recovery settings specific to the VSP; and establishing a set of failover settings specific to the VSP.

23. The computer program product of claim 22, wherein the method further comprises accepting user input for establishing the set of synchronous replication settings via a GUI (Graphical User Interface) application that serves as an entry point to the replication session manager.

* * * * *